US012748270B2

(12) United States Patent
Otomo et al.

(10) Patent No.: US 12,748,270 B2
(45) Date of Patent: Sep. 29, 2026

(54) DETERMINATION METHOD, OPTICAL CONTROL ELEMENT AND MANUFACTURING METHOD THEREOF

(71) Applicant: NATIONAL INSTITUTE OF INFORMATION AND COMMUNICATIONS TECHNOLOGY, Tokyo (JP)

(72) Inventors: Akira Otomo, Koganei (JP); Kouichi Tanaka, Koganei (JP); Toshiki Yamada, Koganei (JP); Chiyumi Yamada, Koganei (JP); Shun Kamada, Koganei (JP); Rieko Ueda, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 565 days.

(21) Appl. No.: 18/025,998

(22) PCT Filed: Aug. 20, 2021

(86) PCT No.: PCT/JP2021/030612

§ 371 (c)(1), (2) Date: Mar. 13, 2023

(87) PCT Pub. No.: WO2022/070667

PCT Pub. Date: Apr. 7, 2022

(65) Prior Publication Data

US 2023/0367084 A1 Nov. 16, 2023

(30) Foreign Application Priority Data

Sep. 30, 2020 (JP) ................................ 2020-164925

(51) Int. Cl.
*G02B 6/42* (2006.01)

(52) U.S. Cl.
CPC ......... *G02B 6/4206* (2013.01); *G02B 6/4212* (2013.01); *G02B 6/4274* (2013.01)

(58) Field of Classification Search
CPC ... G02B 6/4206; G02B 6/4212; G02B 6/4274
See application file for complete search history.

(56) References Cited

U.S. PATENT DOCUMENTS 5,943,464 A * 8/1999 Khodja .................. G02F 1/065 385/92
2011/0176141 A1 7/2011 Kawanishi et al.
(Continued)

FOREIGN PATENT DOCUMENTS

CN 111061069 A 4/2020
JP 2012-42899 A 3/2012
(Continued)

OTHER PUBLICATIONS

Bosshard et al. "Organic Nonlinear Optical Materials" (Year: 2001).*
(Continued)

*Primary Examiner* — Uyen Chau N Le
(74) *Attorney, Agent, or Firm* — Morgan, Lewis & Bockius LLP

(57) ABSTRACT

The present disclosure provides an optical control element having an optical waveguide formed of an electro-optic material, and methods of use thereof.

9 Claims, 12 Drawing Sheets

(56) References Cited

U.S. PATENT DOCUMENTS

| | | | |
|---|---|---|---|
| 2012/0172599 A1 | 7/2012 | Otomo et al. | |
| 2013/0284929 A1 | 10/2013 | Ouchi | |
| 2018/0246350 A1 | 8/2018 | Ma et al. | |
| 2019/0225728 A1 | 7/2019 | Otomo et al. | |
| 2020/0407498 A1 | 12/2020 | Takahashi et al. | |
| 2021/0032228 A1 | 2/2021 | Otomo et al. | |

FOREIGN PATENT DOCUMENTS

| | | | | |
|---|---|---|---|---|
| JP | 2013-101295 A | 5/2013 | | |
| WO | 2009/113128 A1 | 9/2009 | | |
| WO | 2011/024774 A1 | 3/2011 | | |
| WO | 2018/003842 A1 | 1/2018 | | |
| WO | WO-2019151318 A1 * | 8/2019 | ........... | C07D 409/06 |
| WO | 2019/168186 A1 | 9/2019 | | |

OTHER PUBLICATIONS

Sosetsu, "Organic Materials for Nonlinear Optics," The Chemical Society of Japan, Quarterly Chemical Review, No. 15: pp. 38, 77-80, 82, 128-131, 136 (1992) (with partial translation).

Bosshard et al., "Organic Nonlinear Optical Materials," Gordon and Breach Publishers, Advances in Nonlinear Optics, vol. 1: pp. 9, 12, 23, 28-30, 141-144, 146-149, 154-161, 164-167, and 170-171 (1995).

Kaino, "Recent Advance on Photonic Organic Materials for Information and Telecommunication Applications," CMC Publishing Co., Ltd., p. 67 (2007) (with partial translation).

Dalton et al., "Organic Electro-Optics and Photonics," Materials Research Society, pp. 49-51, 55, 57, 59, 61, 72, 89, 92-95, 104, 105, 122, 123, 127, 130, 133, 134, 140, 142, 153, 164, 165, 166-168, and 234-238 (2015).

Hirano, "High-Speed Optical-Beam Scanning by an Optical Phased Array Using Electro-Optic Polymer Waveguides," IEEE Photonics Journal, vol. 12 No. 2: pp. 600807-1-600807-7, DOI: 10.1109/JPHOT.2020.2981743 (2020).

International Search Report issued in corresponding International Patent Application No. PCT/JP2021/030612 dated Nov. 16, 2021.

* cited by examiner

DETERMINATION METHOD, OPTICAL CONTROL ELEMENT AND MANUFACTURING METHOD THEREOF

TECHNICAL FIELD

The present invention relates to a determination method by which a wavelength band suitable in the case of using an electro-optic material for an optical control element is determined based on a new figure of merit, a manufacturing method of an optical control element using this determination method, and an optical control element.

BACKGROUND ART

As electro-optic materials (EO materials) applicable to optical control elements such as optical modulators, optical switches, optical interconnects, optoelectronic circuits, wavelength converters, electric field sensors, THz wave generators/detectors and optical phased arrays, the use of inorganic ferroelectric materials such as lithium niobate ($LiNbO_3$) is known. Inorganic ferroelectric materials have limitations on the high-speed performance, size reduction and integration of optical control elements and also have a problem in that hybridization with semiconductor materials advantageous in size reduction and integration is difficult.

On the other hand, organic electro-optic polymers (organic EO polymers) exhibit a large electro-optic effect compared with inorganic ferroelectric materials. In addition, organic EO polymers are capable of high-speed operation and are easy to be hybridized with semiconductors, ferroelectric substances and the microstructures thereof. As described above, organic EO polymers are capable of size reduction and integration in addition to high-speed performance and power saving and are thus expected as materials responsible for next-generation optical communication.

CITATION LIST

Non Patent Literature

NPL 1: "Organic Materials For Nonlinear Optics", The Chemical Society of Japan, Kikan kagaku sosetsu No. 15 (1992)

NPL 2: "Organic Nonlinear Optical Materials", Ch. Bosshard, et al., Gordon and Breach Publishers (1995)

NPL 3: "Recent Advance on Photonic Organic Materials for Information and Telecommunication Applications", supervised by Toshikuni Kaino, CMC Publishing Co., Ltd. (2007)

NPL 4: "Organic Electro-Optics and Photonics", Larry R. Dalton, et. al., Cambridge University Press (2015)

SUMMARY OF INVENTION

Technical Problem

Organic EO polymers have been thus far developed under the assumption of being used in a C band, which is a long-distance communication wavelength band. Therefore, organic EO polymers and the like that are used for optical control elements have been evaluated by comparing the value of the electro-optic coefficient r or $n^3r$ (n: refractive index) and/or α (α: propagation loss per unit length) or $n^3r/\alpha$ and have been evaluated as more suitable for use in the C band as the value of r or $n^3r$ is larger and/or α is smaller.

In recent years, there has been a demand for development of an optical control element useful (highly efficient) in shorter wavelength bands than the C band. Organic EO polymers that are transparent in short wavelength bands have a small electro-optic coefficient r, have been evaluated as poor when evaluated using the value of r, $n^3r$, α or $n^3r/\alpha$ and have attracted no attention as a material capable of achieving an optical control element that is highly efficient in shorter wavelength bands than the C band.

An objective of the present invention is to provide a determination method which enables to appropriately evaluate the performance of electro-optic materials in each wavelength band, a manufacturing method of an optical control element using the determination method, and an optical control element.

Solution to Problem

The present invention provides a determination method, a manufacturing method of an optical control element and an optical control element that will be described below.

[1] A determination method including determining a wavelength band suitable for use of an optical control element, wherein the optical control element has an optical waveguide formed using an electro-optic material, wherein the determination method includes selecting the following formula (I) and/or formula (II) as a formula for calculating a figure of merit of the electro-optic material at a wavelength λ based on a required characteristic of the optical control element, and calculating a figure of merit FOM1 and/or a figure of merit FOM2 using a formula selected in the selecting, and in the determining, a wavelength band suitable for use of the optical control element is determined based on a figure of merit of the electro-optic material calculated in the calculating.

[Math 1]

$$FOM1 = \frac{n^3 r}{\lambda^2} \quad (I)$$

$$FOM2 = \frac{n^3 r}{\alpha\lambda^2} \quad (II)$$

[In the formulae, n is a refractive index of the electro-optic material, r is an electro-optic coefficient of the electro-optic material, α is a propagation loss per unit length in a phase modulation region in the optical waveguide, and λ is a wavelength].

[2] The determination method according to [1], wherein, in the selecting, at least the formula (II) is selected, and in the calculating, when a ratio ($Loss_{max}/L_{max}$) between an acceptable propagation loss $Loss_{max}$ of the phase modulation region and an acceptable length $L_{max}$ of the phase modulation region is defined as an acceptable propagation loss per unit length $\alpha_c$ in the phase modulation region, at each wavelength λ, in a case where there is a relationship of $\alpha \le \alpha_c$, the figure of merit FOM2 is calculated with a substitution of $\alpha = \alpha_c$, and, in a case where there is a relationship of $\alpha > \alpha_c$, the figure of merit FOM2 is calculated using α.

[3] The determination method according to [1] or [2], wherein the electro-optic material is an electro-optic polymer.

[4] A manufacturing method of an optical control element suitable for use in the wavelength band, the method including:

determining the wavelength band by the determination method according to any one of [11] to [3]; and forming the optical waveguide using the electro-optic material.

[5] An optical control element having an optical waveguide formed of an electro-optic material, wherein the following [A] and/or [B] is satisfied.

[A] The electro-optic material has a figure of merit FOM1 calculated based on the following formula (I) of 1.2 $(V \cdot cm)^{-1}$ or more at any wavelength in a wavelength band of 1259 nm or shorter, and the optical control element is used in a wavelength band of 1259 nm or shorter where the figure of merit FOM1 becomes 1.2 $(V \cdot cm)^{-1}$ or more,

[B] the electro-optic material has a figure of merit FOM2 calculated based on the following formula (II) of 0.20 $(V \cdot dB)^{-1}$ or more at any wavelength in a wavelength band of 1259 nm or shorter, and the optical control element is used in a wavelength band of 1259 nm or shorter where the figure of merit FOM2 becomes 0.20 $(V \cdot dB)^{-1}$ or more.

[Math 2]

$$FOM1 = \frac{n^3 r}{\lambda^2} \quad \text{(I)}$$

$$FOM2 = \frac{n^3 r}{\alpha\lambda^2} \quad \text{(II)}$$

[In the formulae, n is a refractive index of the electro-optic material, r is an electro-optic coefficient of the electro-optic material, a is a propagation loss per unit length in a phase modulation region in the optical waveguide, and a is a wavelength].

[6] The optical control element according to [5], wherein the electro-optic material is an electro-optic polymer.

Advantageous Effects of Invention

According to the present invention, it is possible to provide a determination method by which the performance of electro-optic materials in each wavelength band can be appropriately evaluated and to manufacture an optical control element using this determination method.

DESCRIPTION OF EMBODIMENTS

Figure 1:
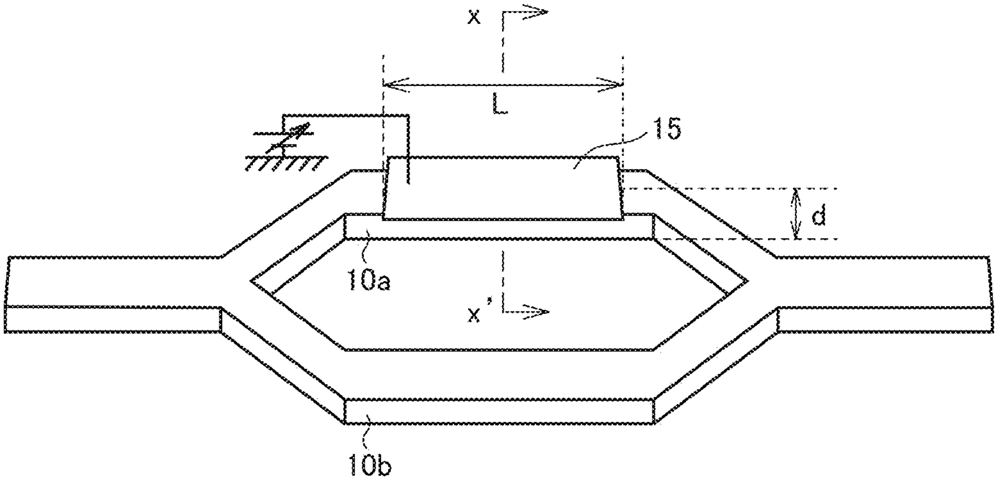
FIG. 1 is a schematic view of a Mach-Zehnder interferometer type waveguide that can be provided in an optical control element.

Hereinafter, an embodiment of the present invention will be described with reference to the drawings, but the present invention is not limited to the following embodiment.

<Determination Method>

A determination method of the present embodiment is intended to determine a wavelength band suitable for the use of an optical control element in which an optical waveguide is formed using an electro-optic material (hereinafter, referred to as "EO material" in some cases) by evaluating the performance of this EO material in each wavelength band. The determination method includes

- a step of selecting the following formula (I) and/or formula (II) as a formula for calculating a figure of merit of the EO material at a wavelength λ based on a required characteristic of the optical control element,
- a step of calculating a figure of merit FOM1 and/or a figure of merit FOM2 using a formula selected in the step of selecting, and
- a step of determining a wavelength band suitable for the use of the optical control element based on a figure of merit of the EO material calculated in the step of calculating.

[Math 3]

$$FOM1 = \frac{n^3 r}{\lambda^2} \quad \text{(I)}$$

$$FOM2 = \frac{n^3 r}{\alpha\lambda^2} \quad \text{(II)}$$

[In the formulae, n is the refractive index of the EO material, r is the electro-optic coefficient of the EO material, α is the propagation loss per unit length in a phase modulation region in the optical waveguide, and λ is the wavelength.]

In the determination method, furthermore, at least the formula (II) may be selected in the step of selecting. In this case, in the step of calculating, it is preferable that, when a ratio ($LOSS_{max}/L_{max}$) between an acceptable propagation loss $Loss_{max}$ of the phase modulation region in the optical waveguide and an acceptable length $L_{max}$ of the phase modulation region is defined as an acceptable propagation loss per unit length $\alpha_c$ in the phase modulation region, at each wavelength λ, in a case where there is a relationship of $\alpha \leq \alpha_c$, the FOM2 is calculated with a substitution of $\alpha = \alpha_c$, and, in a case where there is a relationship of $\alpha > \alpha_c$, the figure of merit FOM2 is calculated using α.

In the present embodiment, the figure of merit FOM1 is expressed with a unit of $(V \cdot cm)^{-1}$, and the figure of merit FOM2 is expressed with a unit of $(V \cdot dB)^{-1}$. As described below, in a case where the electro-optic coefficient r is expressed with a unit of pm/V, the propagation loss a per unit length is expressed with a unit of dB/cm, and the wavelength λ is expressed with a unit of nm, the figures of merit FOM1 and FOM2 are adjusted to be expressed with the above-described units by adjusting the orders or the like of lengths in these units.

In the determination method, a wavelength band suitable for the use of the optical control element is determined based on the figure of merit FOM1 and/or the figure of merit FOM2 of the EO material, which has been newly found by the present inventors. The figure of merit FOM1 and the figure of merit FOM2 are different from conventionally used figure in that $\lambda^2$ is included as shown in the formula (I) and the formula (II). The conventionally used figure is intended to evaluate optical control elements that are used at a specific wavelength such as a C band, and thus figure not including the wavelength λ (the above-described value of r or $n^3r$ and/or the value of a or $n^3r/\alpha$) has been used. In contrast, the figure of merit FOM1 and the figure of merit FOM2, which are used in the present embodiment, are figures each including the wavelength λ in order to evaluate the performance at each wavelength when the optical control element is used at different wavelengths in consideration of the influence of wavelengths.

That is, the conventionally used figure includes no wavelength λ factors and is thus, in some cases, determined to be not suitable for use for optical control elements depending on the operation wavelength bands even when EO materials having the conventionally used figure are used. In contrast, according to the determination method of the present embodiment, the figure of merit FOM1 and/or the figure of merit FOM2 makes it possible to calculate the figure of merit of EO materials in consideration of wavelengths λ at which optical control elements are used (operation wavelength bands). Therefore, in a case where an optical waveguide is formed using an EO material having a figure of merit calculated based on the formula (I) and/or the formula (II), it is possible to determine a wavelength band suitable for the use of an optical control element having the optical waveguide.

(Derivation of Figure of Merit FOM1 and Figure of Merit FOM2)

The figure of merit FOM1 and the figure of merit FOM2, which are expressed by the formula (I) and the formula (II), are figures that are derived based on a technical matter to be described below. Due to the following description, it is possible to understand that the use of the figure of merit FOM1 and the figure of merit FOM2 makes it possible to appropriately determine a wavelength band suitable for the use of an optical control element.

Figure 2:
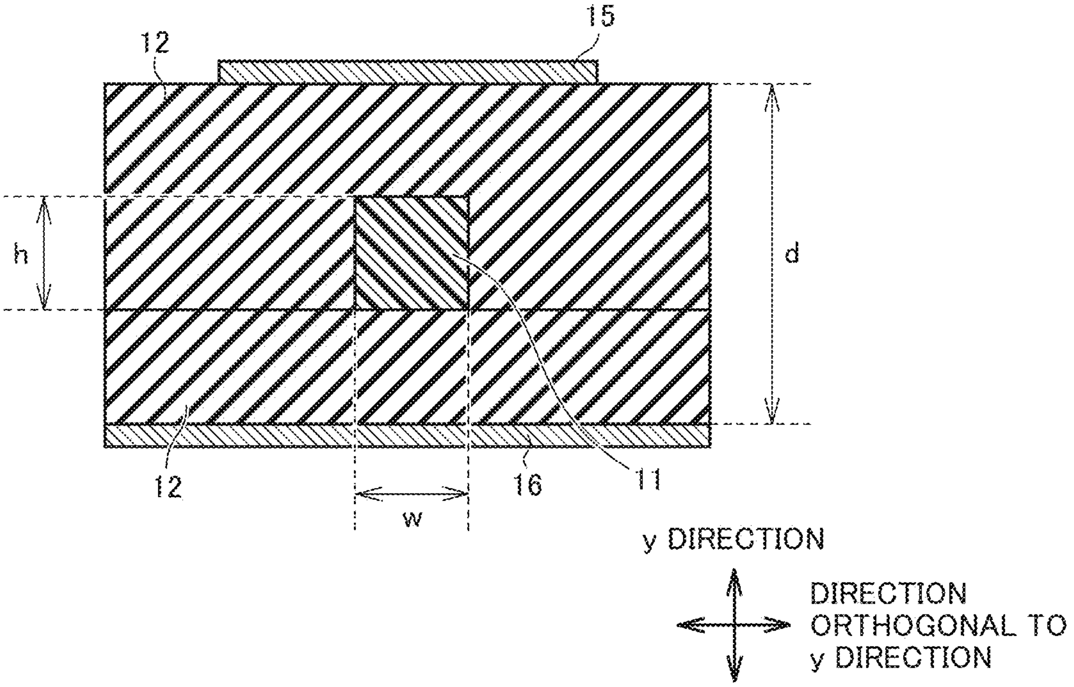
FIG. 2 is a schematic view of an x-x' cross section in FIG. 1.

Hereinafter, a case where the optical control element is an optical modulator and an optical waveguide that is provided in the optical control element is a single-arm-driven Mach-Zehnder interferometer type waveguide (hereinafter, referred to as "MZ type waveguide" in some cases) will be described as an example. FIG. 1 is a schematic view of the MZ type waveguide that can be provided in the optical control element. FIG. 2 is a schematic view of an x-x' cross section in FIG. 1. In the MZ type waveguide, light input from the left side in FIG. 1 propagates through the optical waveguide. As shown in FIG. 2, usually, the optical waveguide is composed of a core 11 where light mainly propagates and a clad 12 provided on the circumference of core 11, and an EO material is contained in core 11. Light input to an optical waveguide of the MZ type waveguide propagates into arm portions 10*a* and 10*b*, which are two branched portions as shown in FIG. 1, then, converges again to be interfered and is output. In one of two arm portions 10*a* and 10*b*, an upper electrode 15 for performing phase modulation is disposed on clad 12. In the present specification, phase modulation refers to shifting of the phase of input light. Phase modulation in the MZ type waveguide refers to shifting of the phase of light that propagates in one of arm portion 10*a*, and the phase is shifted by applying an electric field with upper electrode 15 disposed on arm portion 10*a*.

In the optical control element, when a half-wave voltage (a voltage when the intensity of output light becomes zero) in the MZ type waveguide is indicated by $V_\pi$ [V] and the length of a phase modulation region in the MZ type waveguide is indicated by L (FIG. 1), a figure for evaluating the high-speed performance is expressed as the product of the half-wave voltage $V_\pi$ and the length L (formula (i-1)). The phase modulation region is a region where the above-described phase modulation is performed and, in the MZ type waveguide shown in FIG. 1, is a region where upper electrode 15 on one arm portion 10*a* is disposed. Therefore, the length L of the phase modulation region becomes the length of upper electrode 15 (a length in the light travel direction). In addition, in the optical control element, when the half-wave voltage is indicated by $V_\pi$ [V] and the propagation loss of the phase modulation region is indicated by Loss [dB], a figure for evaluating the power saving is expressed as the product of the half-wave voltage $V_\pi$ and the propagation loss (formula (ii-1)).

[Math 4]

$$V_\pi L = \frac{\lambda}{n^3 r}\frac{d}{\Gamma} \quad \text{(i-1)}$$

$$V_\pi \text{Loss} = V_\pi \alpha L = \frac{\lambda}{n^3 r}\frac{d}{\Gamma}\alpha \quad \text{(ii-1)}$$

[In the formula, λ is the wavelength, n is the refractive index, r is the electro-optic coefficient, d is the distance between electrodes (the distance between upper electrode 15 and a grounding surface (lower electrode) 16) in the phase modulation region, r is an overlap integral between the electric field of light and an applied electric field, and α is the propagation loss per unit length.]

As the value of $V_\pi L$ in the formula (i-1) and the value of $V_\pi$Loss in the formula (ii-1) decrease, the optical control element becomes superior in terms of high-speed performance and power saving. Therefore, in order to obtain an optical control element having excellent high-speed performance, it is preferable to decrease the distance d in the formula (i-1). In addition, in order to obtain an optical control element having excellent power saving, it is preferable to decrease the distance d (FIG. 1 and FIG. 2) in the formula (ii-1). Incidentally, the majority of light that propagates through the optical waveguide propagates through core 11, but some penetrates into clad 12. Therefore, in the phase modulation region, when the distance d becomes small, light that has penetrated from core 11 is likely to be absorbed into upper electrode 15 and lower electrode 16, and thus the amount of light that propagates through the optical waveguide decreases.

From these viewpoints, the present inventors considered that the distance d is preferably set to a distance where the loss of light having a wavelength λ that propagates through the optical waveguide falls into an acceptable range (hereinafter, referred to as "minimum distance $d_{min}$" in some cases) and determined the minimum distance $d_{min}$ at the specific wavelength λ by a procedure to be described next.

Figure 3:
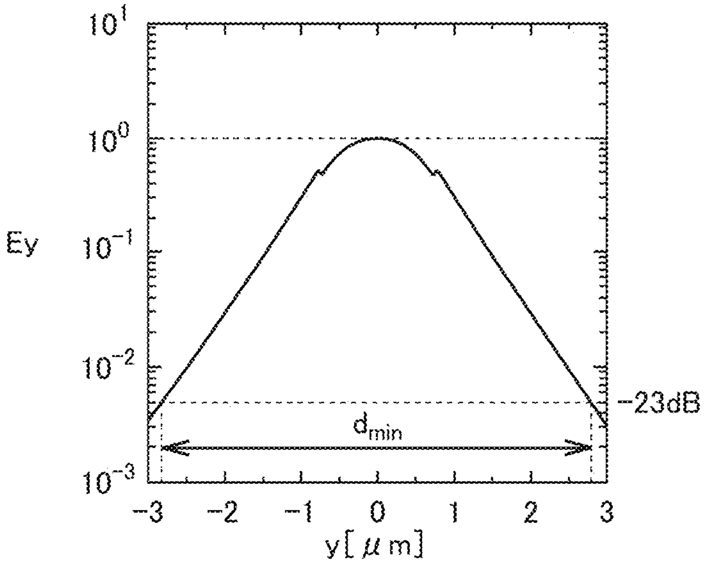
FIG. 3 is a graph showing an electric field Ey of light that propagates through the optical waveguide at each position in a direction of a distance d between electrodes shown in FIG. 2 (y direction).

First, in order to determine the minimum distance $d_{min}$, the broadening (mode) of light that propagates through the optical waveguide was calculated by computation. Specifically, the computation results of the mode of light when light having a wavelength of 1.55 μm was caused to propagate in an optical waveguide where the refractive index of the core (EO polymer) was set to 1.64, the refractive index of the clad (organic silica composite) was set to 1.48 and the size of the core was set to 1.5 μm in length h in a direction of the distance d (y direction) and 1.5 μm in length w in a direction orthogonal to the y direction are shown in FIG. 3. The propagation mode of light was computed by a beam propagation method using optical waveguide simulation software (BeamPROP: Rsoft Design Group, Inc). FIG. 3 is a graph showing an electric field Ey (intensity of the mode of light) of light that propagates through the optical waveguide at each position in the direction of the distance d (y direction) between the electrodes shown in FIG. 2. In FIG. 3, the horizontal axis indicates the position of the center of the core at zero and positions y in the direction of the distance d (y direction) from the position of the center of the core, and the vertical axis indicates the electric field Ey of light at the center of the core (y=0) at one and the electric fields Ey of light at the positions of the distances y as rates relative to the electric field Ey of light at the center of the core. From the results shown in FIG. 3, it can be read that a position where the electric field Ey of light has become sufficiently small compared with that at the center of core, for example, the position y when the electric field Ey of light becomes −23 dB is present at a position of ±2.81 μm.

Next, the propagation loss when the electrodes were disposed at positions y of ±2.81 in the phase modulation region of the MZ type waveguide (when the distance d was set to 5.62 μm) was calculated using the above-described simulation software. As a result of simulation, it was confirmed that the propagation loss per unit length was 0.4 dB/cm and the loss of light that propagated through the optical waveguide was in the acceptable range. The distance d at this time, which was 5.62 μm, was regarded as the minimum distance $d_{min}$ when the operation wavelength was set to 1.55 μm (Table 1 below).

Figure 4:
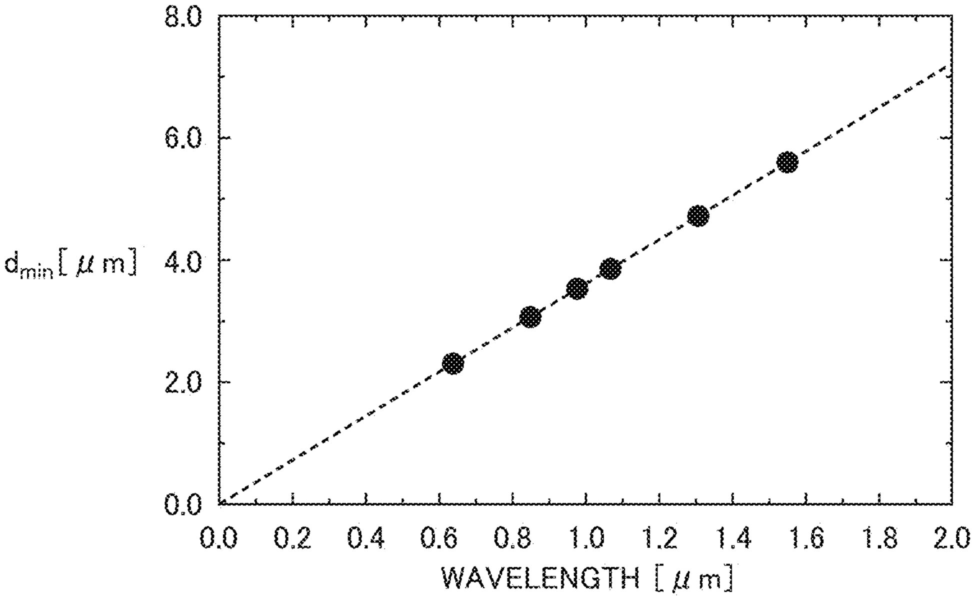
FIG. 4 is a graph where minimum distances $d_{min}$ between the electrodes are plotted with respect to wavelengths propagating through the optical waveguide.

The above-described calculation of the propagation mode of light was also performed on other wavelengths (wavelengths shown in Table 1 below) that propagated through the optical waveguide of the MZ type waveguide, and the minimum distances $d_{min}$ were determined from the positions y when the electric field Ey of light became −23 dB. The results are shown in Table 1 below and FIG. 4. FIG. 4 is a graph where the values shown in Table 1 are plotted (each point in FIG. 4), the plotted points are fitted by the least-squares method (broken line in FIG. 4), and the minimum distances $d_{min}$ were plotted with respect to wavelengths that propagated through the optical waveguide.

TABLE 1

| Wavelength λ [μm] | 0.64 | 0.85 | 0.98 | 1.06 | 1.31 | 1.55 |
|---|---|---|---|---|---|---|
| Minimum distance $d_{min}$ between electrodes [μm] | 2.33 | 3.09 | 3.51 | 3.87 | 4.71 | 5.62 |

The present inventors found from the graph shown in FIG. 4 that the minimum distance $d_{min}$ is proportional to the wavelength λ (there is a relationship of approximately $d_{min}$=3.62×λ) and derived the figure of merit FOM1 and the figure of merit FOM2 expressed by the formula (I) and the formula (II). Specifically, the relationship d=$d_{min}$=3.62×λ found from the graph shown in FIG. 4 was used in the formula (i-1) and the formula (ii-1), thereby leading to relationships each connected by an equal sign in the following formula (i-2) and the formula (ii-2). Since r in these formulae is a constant (Γ≈0.85 in the optical waveguide from which the results in FIG. 3 and FIG. 4 were derived), it is found that the figures expressed by the formula (i-1) and the formula (ii-1) have proportional relationships with $\lambda^2/n^3r$ and $\alpha\lambda^2/n^3r$, respectively, as shown in the right side of the following formula (i-2) and formula (ii-2).

[Math 5]

$$V_\pi L = \frac{\lambda}{n^3 r}\frac{d}{\Gamma} = \frac{3.62\lambda^2}{n^3 r\Gamma} \propto \frac{\lambda^2}{n^3 r} \quad \text{(i-2)}$$

$$V_\pi \text{Loss} = \frac{\lambda}{n^3 r}\frac{d}{\Gamma}\alpha = \frac{3.62\alpha\lambda^2}{n^3 r\Gamma} \propto \frac{\alpha\lambda^2}{n^3 r} \quad \text{(ii-2)}$$

Based on these relationships, the reciprocals of the right side in the formula (i-2) and the formula (ii-2) were defined as the figures of merit FOM1 and FOM2 expressed by the formula (I) and the formula (II).

Due to the above description, it is possible to understand that the use of the figure of merit FOM1 and the figure of merit FOM2 makes it possible to evaluate the performance of the EO material at each wavelength and to appropriately determine a wavelength band suitable for the use of the optical control element obtained using the EO material. Since the optical control element becomes superior in terms of high-speed performance and power saving as the value of $V_\pi L$ of the formula (i-1) and the value of $V_\pi$Loss of the formula (ii-1) decrease, it is possible to determine that an optical control element obtained using an EO material having a large value of the figure of merit FOM1 (formula (I)) has excellent high-speed performance and an optical control element obtained using an EO material having a large value of the figure of merit FOM2 (formula (II)) has excellent power saving.

Next, each step of the determination method of the present embodiment will be described.

(Step of Selecting)

In the step of selecting, based on a required characteristic of the optical control element, at least one of the formula (I) and the formula (II) is selected to calculate the figure of merit of the EO material for forming the optical waveguide in the optical control element. Examples of the required characteristic of the optical control element include the high-speed performance, powder saving and the like of the optical control element. For example, in the case of evaluating the material performance of an EO material suitable to obtain an optical control element from which high-speed performance is required, the formula (I) may be selected in the step of selecting. For example, in the case of evaluating the material performance of an EO material suitable to obtain an optical control element from which power saving is required, the formula (II) may be selected in the step of selecting. Both the formula (I) and the formula (II) may be selected depending on characteristics required from an optical control element as in a case where both high-speed performance and power saving are satisfied.

(Step of Calculating)

In the step of calculating, the figure of merit is calculated using the formula selected in the step of selecting. As the figure of merit that is calculated in the step of calculating, the figure of merit FOM1 is calculated in a case where the formula (I) is selected in the step of selecting, and the figure of merit FOM2 is calculated in a case where the formula (II) is selected in the step of selecting. In the step of calculating, both the figure of merit FOM1 and the figure of merit FOM2 may be calculated.

In a case where the figure of merit FOM2 is calculated in the step of calculating, in the formula (II), the value of the propagation loss per unit length $\alpha$ may be used, and, depending on the value of $\alpha$, an acceptable propagation loss per unit length $\alpha_c$ in the phase modulation region may also be used. Specifically, in the case of $\alpha \leq \alpha_c$ at the wavelength $\lambda$, $\alpha$ is changed to $\alpha_c$ and the figure of merit FOM2 at the wavelength $\lambda$ may be calculated by the formula (II) and, in the case of $\alpha > \alpha_c$, the figure of merit FOM2 at the wavelength $\lambda$ may be calculated by the formula (II) using $\alpha$. The propagation loss per unit length $\alpha_c$ is the ratio ($Loss_{max}/L_{max}$) between the acceptable propagation loss $Loss_{max}$ [dB] of the phase modulation region and the acceptable length $L_{max}$ of the phase modulation region.

All of the acceptable propagation loss per unit length $\alpha_c$ in the phase modulation region, the acceptable propagation loss $Loss_{max}$ of the phase modulation region, and the acceptable length $L_{max}$ of the phase modulation region may be set depending on the kind, use or the like of an optical control element in which an optical waveguide is formed using an EO material. As all of the propagation loss per unit length $\alpha_c$, the propagation loss $Loss_{max}$ and the length $L_{max}$, the maximum values of values in the acceptable ranges can be used.

Due to the relationship indicated by the formula (II), if the numerator of $n^3r$ becomes small, the value of the figure of merit FOM2 becomes small; however, if the denominator of a becomes small, even when the numerator of $n^3r$ becomes small, the value of the figure of merit FOM2 becomes large. Therefore, in a case where the propagation loss per unit length $\alpha$ and $\alpha_c$ satisfy the relationship of $\alpha \leq \alpha_c$, it is possible to appropriately evaluate the contribution of $n^3r$ in the figure of merit FOM2 by calculating the figure of merit FOM2 with a substitution of $\alpha = \alpha_c$ in the formula (II).

(Step of Determining)

In the step of determining, for the optical control element in which the optical waveguide is formed using an EO material, a wavelength band suitable for the use of the optical control element is determined based on the figure of merit of the EO material calculated in the step of calculating. In the step of determining, for example, the figure of merit may be determined using homogeneous broadening analysis (Lorentzian distribution formula) or may be determined using inhomogeneous broadening analysis (Gaussian distribution formula) as described in Examples to be described below.

Subsequently, each member that is used in the determination method of the present embodiment will be described.

(Optical Control Element)

The optical control element has an optical waveguide formed using an EO material as described above. The optical waveguide has core 11 and clad 12 provided so as to surround the circumference of core 11 as shown in FIG. 2, and the EO material is contained in core 11. The shape (structure) of the optical waveguide may be a channel type waveguide as shown in FIG. 2 or may be a ridge type waveguide, a reverse ridge type waveguide, a photonic crystal waveguide or the like.

The optical control element may be an MZ type optical modulator in which a Mach-Zehnder (MZ) interferometer is configured using an optical waveguide as shown in FIG. 1 or may be a nest type MZ type optical modulator in which an MZ interferometer is further integrated on two branch road of another MZ interferometer, a single phase modulator having no branched structures, an optical phased array composed of a plurality of branches and a phase modulator or the like.

As the EO material, a well-known material can be used, and the EO material may be an inorganic material or an organic material. Examples of the inorganic material include an inorganic dielectric material such as lithium niobate, a GaAs semiconductor, an InP semiconductor, glass and the like. Examples of the organic material include an electro-optic crystal material such as DAST, an electro-optic polymer (hereinafter, referred to as "EO polymer" in some cases) and the like.

The EO polymer is a polymer that exhibits a second-order nonlinear optical effect and contains an electro-optic molecule and a base polymer (matrix polymer). The electro-optic molecule may bond to the base polymer or may be dispersed in the base polymer. The electro-optic molecule is a compound that exhibits a second-order nonlinear optical effect. As the electro-optic molecule, a well-known compound may be used and a compound having a structure expressed by a chemical formula shown in the following formula (E-1) to formula (E-5) and formula (E-1a) may be used. The EO material is preferably an organic material and more preferably the EO polymer. The EO material may be the EO polymer containing the compound having a structure expressed by a chemical formula shown in the following formula (E-1) to formula (E-5) and formula (E-1a) or may be the EO polymer in which the above-described compound bonds to the base polymer. The EO polymer may be an EO polymer in which a reactive group of the electro-optic molecule and a reactive group of the base polymer react with each other to form a linking group.

[Chem. 1]

(E-1)

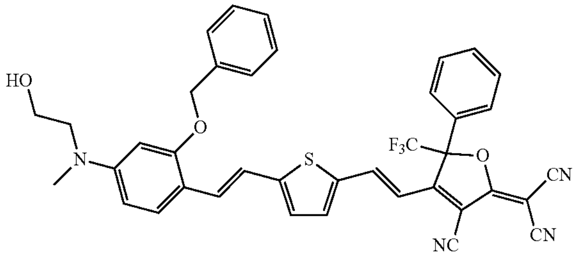

-continued (E-1a)

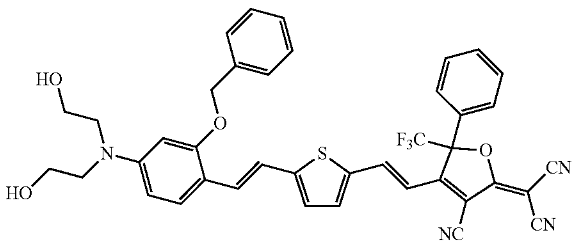

(E-2)

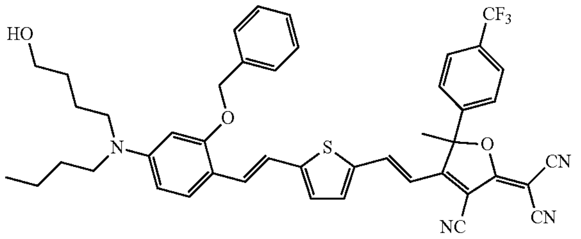

(E-3)

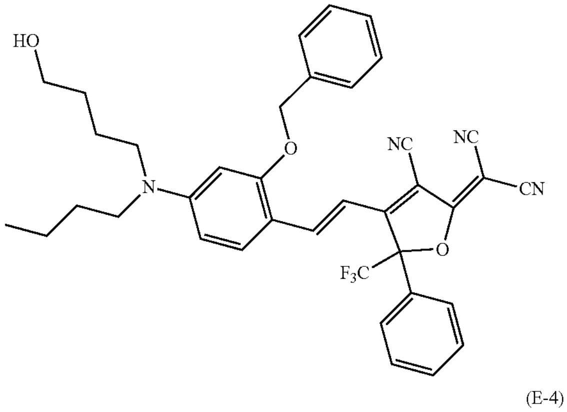

(E-4)

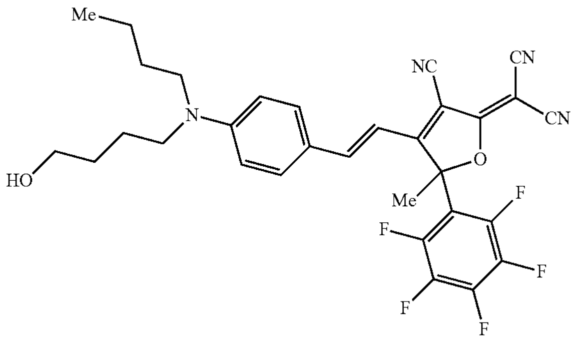

(E-5)

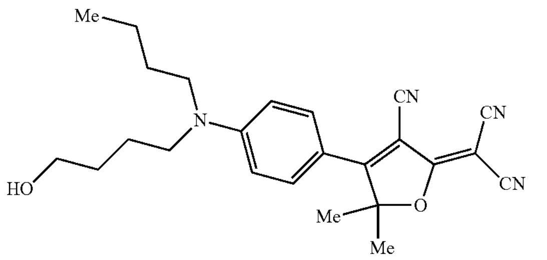

The base polymer (matrix polymer) is a polymer that serves as the matrix of the EO polymer. As the base polymer, a well-known polymer can be used, and examples thereof include a (meth)acrylic polymer such as PMMA, a polyimide, a polycarbonate, an olefin-based polymer, a cycloolefin-based polymer, a vinyl polymer, a polyester, a polyalkylsiloxane, an epoxy resin and the like.

Clad 12 is not particularly limited as long as the clad is formed of a material having a refractive index lower than the refractive index of core 11, and a well-known material can be used. Examples of the material that configures clad 12 include glass such as quartz glass and multi-component glass, a fluororesin, a silicone resin, an organic silica composite (organic silica composite containing an organic component bonding to inorganic silica), a (meth)acrylic polymer such as PMMA, a polyimide, a polycarbonate, an olefin-based polymer, a cycloolefin-based polymer and the like.

In a case where upper electrode 15 and lower electrode 16 are provided in the phase modulation region as shown in FIG. 1 and FIG. 2, upper electrode 15 and lower electrode 16 may be formed of a well-known conductive material such as a metallic material.

Specific examples of the optical control element to which the determination method of the present embodiment is applied include, for example, an optical modulator, an optical switch, an optical transceiver, an optical phased array, a LiDAR, smart glasses, an optical interconnect, an optoelectronic circuit, a wavelength converter, an electric field sensor, a THz wave generator/detector and the like.

<Manufacturing Method of Optical Control Element>

A manufacturing method of an optical control element of the present embodiment includes a step of determining a wavelength band suitable for the use of the optical control element by the above-described determination method and a step of forming an optical waveguide using an EO material for which a figure of merit has been determined in the step of calculating. This makes it possible to manufacture an optical control element suitable for use in the wavelength band determined in the step of determining.

Specific examples of the optical control element include the above-described optical control element. The optical waveguide preferably includes core 11 and clad 12 as described above. The EO material that is used in the step of forming the optical waveguide can be used to form core 11 in the optical waveguide. Examples of the EO material include the materials described above, and the EO polymer is preferable. The optical waveguide may be formed by a well-known forming method.

<Optical Control Element Used in Wavelength Band of 1259 nm or Shorter>

An optical control element that is used in a wavelength band of 1259 nm or shorter of the present embodiment (hereinafter, referred to as "specific optical control element" in some cases) is an optical control element that has an optical waveguide formed of an EO material and is used in a wavelength band of 1259 nm or shorter where the figure of merit FOM1 becomes 1.2 $(V\cdot cm)^{-1}$ or more and/or a wavelength band of 1259 nm or shorter where the figure of merit FOM2 becomes 0.20 $(V\cdot dB)^{-1}$ or more (hereinafter, a wavelength band that satisfies these conditions will be referred to as "specific wavelength band" in some cases). The specific optical control element satisfies the following [A] and/or [B].

[A] The figure of merit FOM1 calculated based on the formula (I) of the EO material contained in the specific optical control element is 1.2 $(V\cdot cm)^{-1}$ or more at any wavelength in a wavelength band of 1259 nm or shorter, and the specific optical control element is used in a wavelength band of 1259 nm or shorter where the figure of merit FOM1 becomes 1.2 $(V \cdot cm)^{-1}$ or more.

[B] The figure of merit FOM2 calculated based on the formula (II) of the EO material contained in the specific optical control element is 0.2 $(V \cdot dB)^{-1}$ or more at any wavelength in a wavelength band of 1259 nm or shorter, and the specific optical control element is used in a wavelength band of 1259 nm or shorter where the figure of merit FOM2 becomes 0.2 $(V \cdot dB)^{-1}$ or more.

In the present specification, the figure of merit FOM1 and the figure of merit FOM2 of the specific optical control element are defined as values determined using inhomogeneous broadening analysis (Gaussian dispersion formula) as described in the Examples to be described below.

According to the specific optical control element, it is possible to provide a useful (highly efficient) optical control element in a short wavelength band of 1259 nm or shorter.

Specific examples of the specific optical control element include the above-described optical control element. The optical waveguide preferably includes core 11 and clad 12 as described above. The EO material can be used to form core 11 in the optical waveguide. Examples of the EO material include the materials described above, and the EO polymer is preferable. Examples of the EO material that forms core 11 in the specific optical control element include compounds having a structure expressed by a chemical formula shown in the formula (E-2) and the formula (E-3). In a case where upper electrode 15 and lower electrode 16 are provided in the phase modulation region of the optical waveguide as described above, examples of the material that forms upper electrode 15 and lower electrode 16 include well-known conductive materials such as metallic materials.

The specific wavelength band is a wavelength band of 1259 nm or shorter and where the figure of merit FOM1 and/or the figure of merit FOM2 becomes the above-described ranges or more. The wavelength band of 1259 nm or shorter may be 1140 nm or shorter, is normally 200 nm or longer and may be 300 nm or longer, may be 400 nm or longer, may be 500 nm or longer or may be 600 nm or longer. In addition, the wavelength band where the figure of merit FOM1 becomes 1.2 $(V \cdot cm)^{-1}$ or more may be a wavelength band where FOM1 becomes 1.4 $(V \cdot cm)^{-1}$ or more, a wavelength band where FOM1 becomes 1.5 $(V \cdot cm)^{-1}$ or more or a wavelength band where FOM1 becomes 1.8 $(V \cdot cm)^{-1}$ or more and is normally a wavelength band where FOM1 becomes 48 $(V \cdot cm)^{-1}$ or less. The wavelength band where the figure of merit FOM2 of the EO material becomes 0.20 $(V \cdot dB)^{-1}$ or more may be a wavelength band where FOM2 becomes 0.25 $(V \cdot dB)^{-1}$ or more or a wavelength band where FOM2 becomes 0.30 $(V \cdot dB)^{-1}$ or more and is normally a wavelength band where FOM2 becomes 8 $(V \cdot dB)^{-1}$ or less. The numerical ranges of the above-described wavelength bands, figure of merit FOM1 and figure of merit FOM2 can be arbitrarily combined together.

In a case where the specific wavelength range is the above-exemplified range, the wavelength bands of the figures of merit FOM1 and FOM2 in the wavelength band of 1259 nm or shorter and the values of the figures of merit FOM1 and FOM2 also change to the ranges exemplified in the specific wavelength range.

EXAMPLES

Hereinafter, the present invention will be more specifically described by showing Examples, but the present invention is not limited by these examples.

Examples 1 to 5

EO polymers (EO materials) in which a compound expressed by a chemical formula shown in the formula (E-1) to the formula (E-5) (hereinafter, referred to as "compound (E-1)" or the like in some cases) bonded to a base polymer were prepared by the following procedure.

(Preparation of Compound (E-1))

The compound (E-1) was prepared by a procedure described in Example 57 of WO 2011/024774.

(Preparation of Compound (E-2))

A compound (E-2) was prepared by a procedure described in Synthesis Example 13 of WO 2019/151318.

(Preparation of Compound (E-3))

A compound (E-3) (2-[4-[(E)-2-(benzyloxy)-4-[butyl(4-hydroxybutyl)amino]styryl]3-cyano-5-(trifluoromethyl)-5-phenylfuran-2(5H)-ylidene]malononitrile) was synthesized by the following procedure.

Synthesis of 4-t-butyldiphenylsilyloxybutylbutylamine (E3-1)

[Chem. 2]

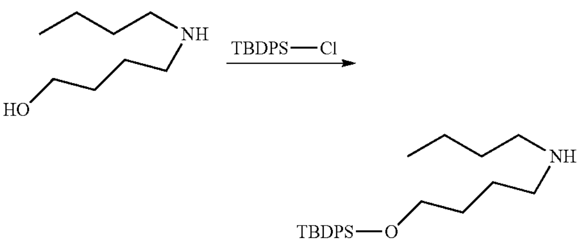

(E3-1)

Under an Ar atmosphere, a solution obtained by mixing 4-butylaminobutanol (22.2 g (0.156 mol)), triethylamine (37.3 g (0.366 mol)) and DryDMF (230 mL) was cooled with water, TBDPSCl (40.6 g (0.153 mol)) was added dropwise at 4° C. to 10° C. for 10 minutes, then, the temperature was raised up to room temperature, and the reaction mixture was stirred for three hours. The reaction mixture was dispersed in 1.2 L of water and extracted twice with ethyl acetate. The organic layer was washed with water (twice) and saturated salt water and dried with anhydrous sodium sulfate, and the solvent was concentrated under reduced pressure, thereby obtaining 55.3 g of a compound expressed by the formula (E3-1) (hereinafter, referred to as "compound (E3-1)" in some cases) (yield: 92.3%).

Synthesis of N,N-4-t-butyldiphenylsilyloxybutylbutyl) 3-benzyloxyaminobenzene (E3-2)

[Chem. 3]

-continued

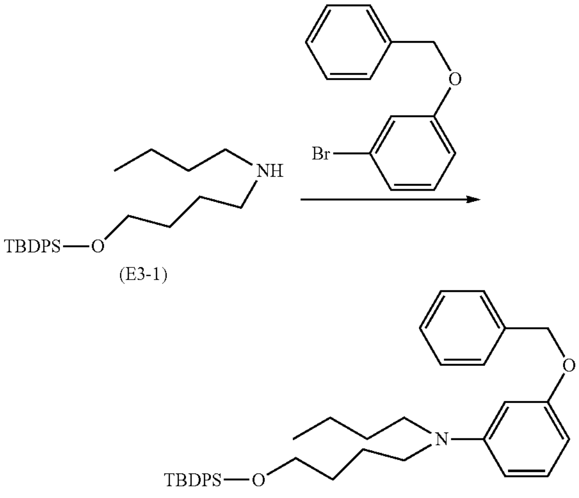

(E3-1)

(E3-2)

Under an Ar atmosphere, $(TMS)_2NK$ (13.5 g (67.7 mmol)) was added to the solution of the compound (E3-1) (22.0 g (57.4 mmol)), 3-benzyloxybromobenzene (14.5 g (55.1 mmol)) and dry toluene (290 mL), heated to 90° C. to 97° C. and stirred for one hour. $(TMS)_2NK$ (3.0 g (15 mmol)) was added thereto, heated and stirred for one hour and then cooled. The reaction mixture was washed with 10% salt water (200 mL) twice, dried with anhydrous sodium sulfate and then concentrated, thereby obtaining 34.8 g of a residue. This residue was purified by silica gel chromatography (300 g of silica gel, $CHCl_3$/HEXANE: 1/1), and 18.6 g (32.9 mmol) of a compound expressed by the formula (E3-2) (hereinafter, referred to as "compound (E3-2)" in some cases) was obtained (yield: 60%).

Synthesis of (N,N-4-hydroxybutylbutyl) 3-benzyloxyaminobenzene (E3-3)

[Chem. 4]

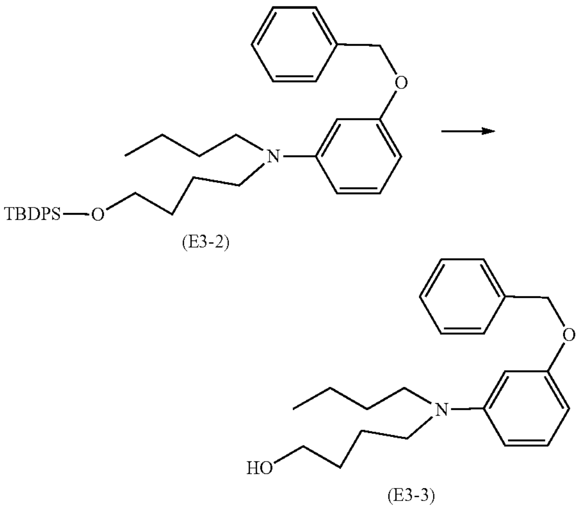

(E3-2)

(E3-3)

Under an Ar atmosphere, 1.0M-TBAF-THF (83 mL (83 mmol)) was added to the solution of the compound (E3-2) (18.6 g (32.9 mmol)) and THF (60 mL), stirred for one hour at 22° C. to 23° C. The reaction mixture was dispersed in water (300 mL) and extracted twice with ethyl acetate (150 m L). The organic layer was washed with 10% salt water (100 mL) twice and dried with anhydrous sodium sulfate, and the solvent was concentrated under reduced pressure. An obtained residue was purified by silica gel chromatography (300 g of silica gel, $CHCl_3$/AcOEt:3/1), and 9.77 g (29.8 mmol) of a compound expressed by the formula (E3-3) (hereinafter, referred to as "compound (E3-3)" in some cases) was obtained (yield: 91%).

Synthesis of (N,N-4-acetoxybutylbutyl) 3-benzyloxyaminobenzene (E3-4)

[Chem. 5]

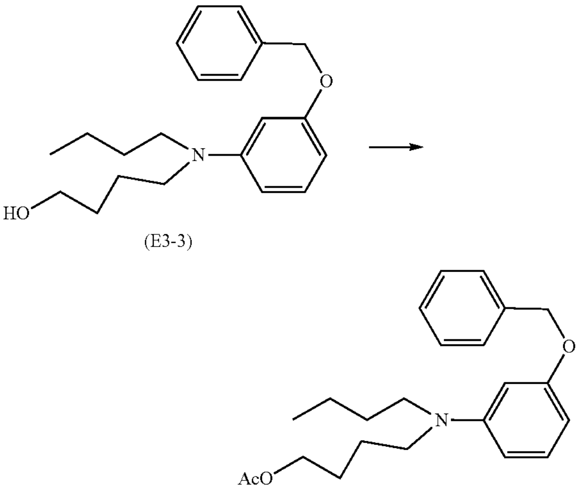

(E3-3)

(E3-4)

Under an Ar atmosphere, the solution of the compound (E3-3) (9.65 g (29.5 mmol)), triethylamine (4.60 g (45.5 mmol)) and dry methylene chloride (100 mL) was cooled with ice water, acetyl chloride (3.2 g (40.8 mol)) was added dropwise at 3° C. to 15° C. for 20 minutes and stirred at room temperature for one hour. The reaction mixture was dispersed in ice water (200 mL) in which hydrochloric acid (5 mL (60 mmol)) had been dissolved and quenched. The organic layer was washed with water (200 mL) twice, further washed with 5% sodium bicarbonate water (100 mL) and dried with anhydrous sodium sulfate, and the solvent was concentrated under reduced pressure, thereby obtaining 10.9 g (29.5 mmol) of a compound expressed by the formula (E3-4) (hereinafter, referred to as "compound (E3-4)" in some cases) (yield: 100%).

Synthesis of (N,N-4-acetoxybutylbutyl) 3-benzyloxy-4-formylaminobenzene (E3-5)

[Chem. 6]

-continued

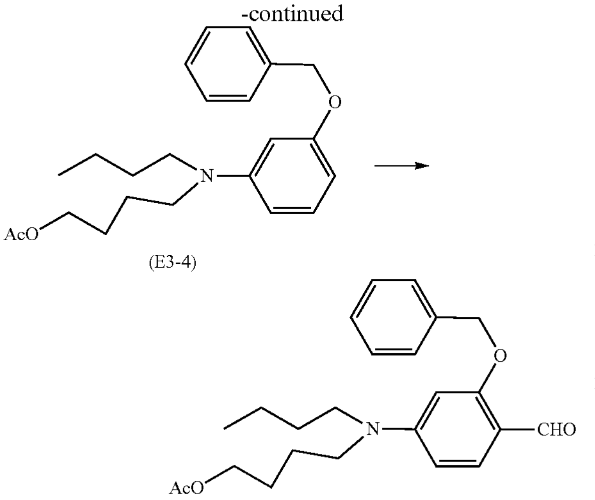

(E3-4)

(E3-5)

Under an Ar atmosphere, phosphorus oxychloride (5.4 g (35 mmol)) was added dropwise to ice-cooling anhydrous DMF (40 mL) at 5° C. to 7° C. for 15 minutes, then, the temperature was raised up to room temperature, and the reaction mixture was stirred for 30 minutes. Subsequently, under ice cooling the solution of the compound (E3-4) (10.8 g (29.2 mmol)) and anhydrous DMF (15 mL) was added dropwise to the reaction mixture at 5° C. to 8° C., stirred at room temperature for 30 minutes, heated to increase the inner temperature to about 70° C., stirred for one hour and cooled with ice water, and 20% NaOAc water (70 mL) was added dropwise. This was stirred at room temperature for one hour and then extracted twice with ethyl acetate (100 mL). The organic layer was washed with water (twice) and saturated salt water and dried with anhydrous sodium sulfate, and the solvent was concentrated under reduced pressure, thereby obtaining a residue (11.2 g). This residue was purified by silica gel chromatography (350 g of silica gel, $CHCl_3$/AcOEt:4/1), and 9.27 g (23.3 mmol) of a compound expressed by the formula (E3-5) (hereinafter, referred to as "compound (E3-5)" in some cases) was obtained (yield: 80%).

$^1$H-NMR analysis of the compound (E3-5) was performed.

$^1$H-NMR $CDCl_3$ 0.94 (t 3H), 1.35 (m 2H), 1.59 (m 2H), 1.63 (m 2H), 2.05 (s 3H), 3.26 (t 2H), 3.30 (t 2H), 4.07 (t 2H), 5.18 (s 2H), 6.01 (d 1H), 6.26 (t 1H), 7.33 (t 1H), 7.36-7.45 (m 4H), 7.72 (d 1H), 10.25 (s 1H)

Synthesis of (N,N-4-hydroxybutylbutyl) 3-benzyloxy-4-formylaminobenzene (E3-6)

[Chem. 7]

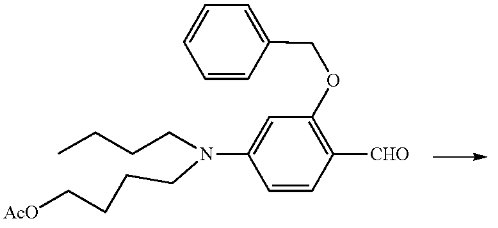

(E3-5)

-continued

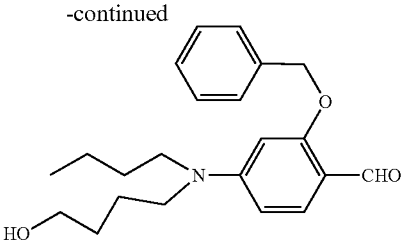

(E3-6)

Under an Ar atmosphere, 2N—NaOH water (60 mL (120 mmol)) was added dropwise to the solution of the compound (E3-5) (9.10 g (22.9 mmol)) and EtOH (70 mL) for 30 minutes at 21° C. to 28° C. and then stirred for one hour. The reaction mixture was dispersed in water (210 mL) and extracted twice with chloroform (200 mL). The organic layer was washed twice with 10% salt water (100 mL) and dried with anhydrous sodium sulfate, and the solvent was concentrated under reduced pressure, thereby obtaining a residue (8.55 g). This residue was purified by silica gel chromatography (350 g of silica gel, $CHCl_3$/AcOEt:3/1 →1/1), and 7.62 g (21.4 mmol) of a compound expressed by the formula (E3-6) (hereinafter, referred to as "compound (E3-6)" in some cases) was obtained (yield: 93%).

$^1$H-NMR analysis of the compound (E3-6) was performed.

$^1$H-NMR $CDCl_3$ 0.94 (t 3H), 1.32 (m 2H), 1.50-1.62 (m 4H), 1.63-1.71 (m 2H), 3.27 (t 2H), 3.33 (t 2H), 3.67 (t 2H), 5.18 (s 2H), 6.03 (d 1H), 6.26 (t 1H), 7.33 (t 1H), 7.35-7.45 (m 4H), 7.71 (d 1H), 10.24 (s 1H)

(Synthesis of Compound (E-3))

[Chem. 8]

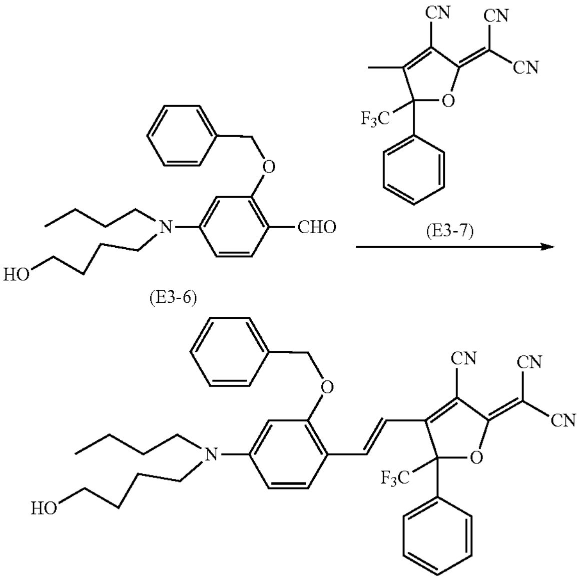

(E3-7)

(E3-6)

(E-3)

Under an Ar atmosphere, the solution of the compound (E3-6) (7.50 g (21.1 mmol)), the compound (E3-7) (8.60 g (27.3 mmol)) and EtOH (200 mL) was heated to 37° C. to 45° C., stirred for one hour and then cooled with ice water. Precipitated crystals were filtered, washed with EtOH and then dried under reduced pressure at 50° C., thereby obtaining 12.70 g of the compound (E-3) (yield: 93%).

$^{1}$H-NMR analysis and $^{13}$C-NMR analysis of the compound (E-3) were performed.

$^{1}$H-NMR DMSO-d6

0.90 (t 3H), 1.27-1.35 (m 2H), 1.42-1.53 (m 2H), 1.53-1.62 (m 2H), 3.42 (m 2H), 3.47-3.59 (m 4H), 5.21 (m 2H), 6.26 (bs 1H), 6.59 (dd 1H), 6.78 (bd 1H), 7.20-8.20 (m 12H)

$^{13}$C-NMR analysis DMSO-d6

13.61, 19.35, 23.90, 29.21, 29.31, 50.65, 50.80, 60, 16, 69.87, 98.10, 109.22, 112.26, 112.94, 114.20, 121.85, 126.23, 127.88, 128.22, 128.47, 129.43, 130.45, 130.88, 135.80, 156.36, 161.80, 176.39

(Preparation of Compound (E-4))

A compound (E-4) ((E)-2-(4-(4-(butyl(4-hydroxybutyl) amino]styryl]-3-cyano-5-methyl-5-(perfluorophenyl)furan-2(5H)-ylidene)malononitrile) was synthesized by the following procedure.

Synthesis of N-butyl-N-(4-(t-butyldiphenylsilyl) oxy)butylaniline (E4-2)

[Chem. 9]

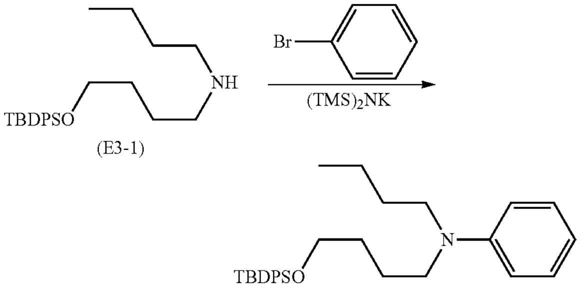

(E3-1)

(E4-2)

Under an Ar atmosphere, $(TMS)_2NK$ (29.5 g (0.15 mol)) was added to the solution of the compound (E3-1) (55.3 g (0.14 mol)), bromobenzene (27.1 g (0.17 mol)) and dry toluene (470 mL), heated to 90° C. to 97° C. and stirred for three hours. This was cooled, then, washed with water (five times) and concentrated at 55° C., thereby obtaining 70.1 g of a residue. This residue was purified by silica gel chromatography (740 g of silica gel, n-Hex, n-Hex/AcOEt:25/1), and 54.7 g of a compound expressed by the formula (E4-2) (hereinafter, referred to as "compound (E4-2)" in some cases) was obtained (yield: 83%).

Synthesis of 4-(butyl(phenyl)amino)butan-1-ol (E4-3)

[Chem. 10]

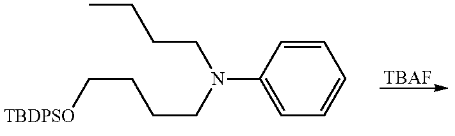

(E4-2)

-continued

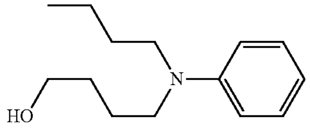

(E4-3)

Under an Ar atmosphere, 1.0M-TBAF-THF (151 mL (0.15 mol)) was added to the solution of the compound (E4-2) (54.7 g (0.12 mmol)) and THF (500 mL), stirred for one hour at 22° C. to 23° C. The reaction mixture was dispersed in water (1 L) and extracted with ethyl acetate. The organic layer was washed with water (twice) and saturated salt water in order and dried with anhydrous sodium sulfate, and the solvent was concentrated under reduced pressure, thereby obtaining 56.5 g of a residue. This residue was purified by silica gel chromatography (600 g of silica gel, n-Hex/AcOEt:3/1, 1/2), and 26.5 g of a compound expressed by the formula (E4-3) (hereinafter, referred to as "compound (E4-3)" in some cases) was obtained (yield: 100%).

Synthesis of 4-(butyl(phenyl)amino)butylacetate (E4-4)

[Chem. 11]

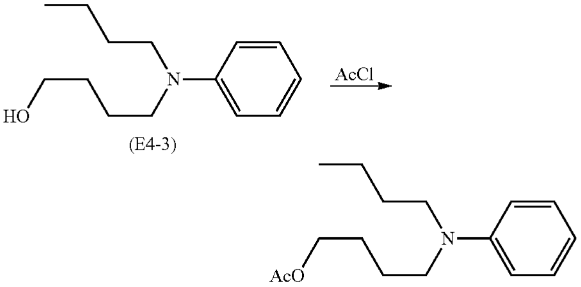

(E4-3)

(E4-4)

Under an Ar atmosphere, the solution of the compound (E4-3) (26.5 g (0.12 mol)), triethylamine (24.2 g (0.24 mol)) and dry methylene chloride (200 mL) was cooled with ice water, and acetyl chloride (12.3 g (0.16 mol)) was added dropwise at 3° C. to 8° C. for 25 minutes. The reaction mixture was stirred at the same temperature for one hour, and then water (200 m L) was added dropwise to quench the reaction. The reaction mixture was separated, then, washed with water and saturated salt water and dried with anhydrous sodium sulfate, and the solvent was concentrated under reduced pressure, thereby obtaining 31 g of a residue. This residue was purified by silica gel chromatography (230 g of silica gel, n-Hex/AcOEt:10/1, 9/1), and 28.2 g of a compound expressed by the formula (E4-4) (hereinafter, referred to as "compound (E4-4)" in some cases) was obtained (yield: 89%).

Synthesis of (N,N-4-acetoxybutylbutyl)-4-formylaminobenzene (E4-5)

[Chem. 12]

-continued

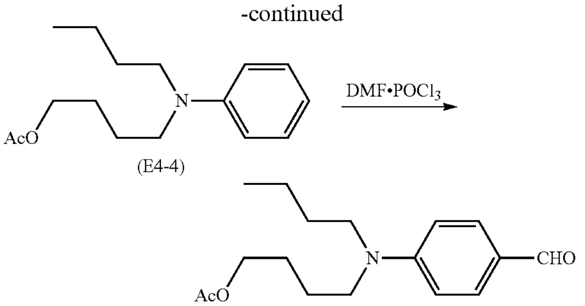

(E4-4)

(E4-5)

Under an Ar atmosphere, phosphorus oxychloride (19.8 g (128.8 mmol)) was added dropwise to ice-cooling anhydrous DMF (160 mL) at 5° C. to 7° C. for 15 minutes, then, the temperature was raised up to room temperature, and the reaction mixture was stirred for 30 minutes. Subsequently, the solution of the compound (E4-4) (28.2 g (107.1 mol)) and anhydrous DMF (85 mL) was added dropwise at 18° C. to 30° C. for 15 minutes, then, heated to 85° C. to 90° C. and stirred for 2.5 hours. After ice water cooling, 20% NaOAc water (240 mL) was added dropwise. This was stirred at room temperature for one hour and then extracted with ethyl acetate. The organic layer was washed with water twice and saturated salt water and dried with anhydrous sodium sulfate, and the solvent was concentrated under reduced pressure, thereby obtaining a residue (29.4 g). This residue was purified by silica gel chromatography (250 g of silica gel, n-Hex/AcOEt:5/1, 1/1), and 26.4 g of a compound expressed by the formula (E4-5) (hereinafter, referred to as "compound (E4-5)" in some cases) was obtained (yield: 85%).

Synthesis of (N,N-4-hydroxybutylbutyl)-4-formylaminobenzene (E4-6)

[Chem. 13]

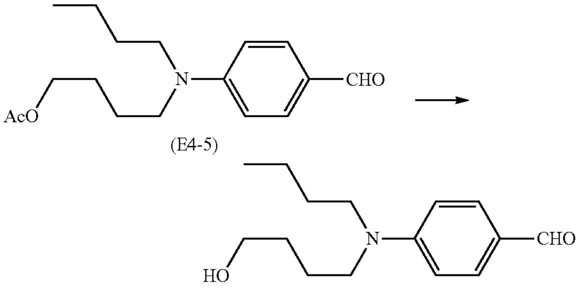

(E4-5)

(E4-6)

Under an Ar atmosphere, 2N—NaOH water (152 mL (304 mmol)) was added dropwise to the solution of the compound (E4-5) (26.4 g (90.6 mmol)) and EtOH (165 mL) for 30 minutes at 21° C. to 25° C. and then stirred for one hour. The reaction mixture was dispersed in water (1 L) and extracted with ethyl acetate. The organic layer was washed with water twice and saturated salt water in order and dried with anhydrous sodium sulfate, and the solvent was concentrated under reduced pressure, thereby obtaining a residue (21.8 g). This residue was purified by silica gel chromatography (220 g of silica gel, n-Hex/AcOEt: 1/1→1/2), and 20.8 g of a compound expressed by the formula (E4-6) (hereinafter, referred to as "compound (E4-6)" in some cases) was obtained (yield: 92%).

Preparation of 2-[3-cyano-4,5-dimethyl-5-(perfluorophenyl)furan-2(5H)-ylidene]malononitrile (E4-7)

A compound expressed by a formula (E4-7) (hereinafter, referred to as "compound (E4-7)" in some cases) was prepared by the procedure described in Synthesis Example 1 of an EO molecule in WO 2019/151318.

<Synthesis of Compound (E-4)>

[Chem. 14]

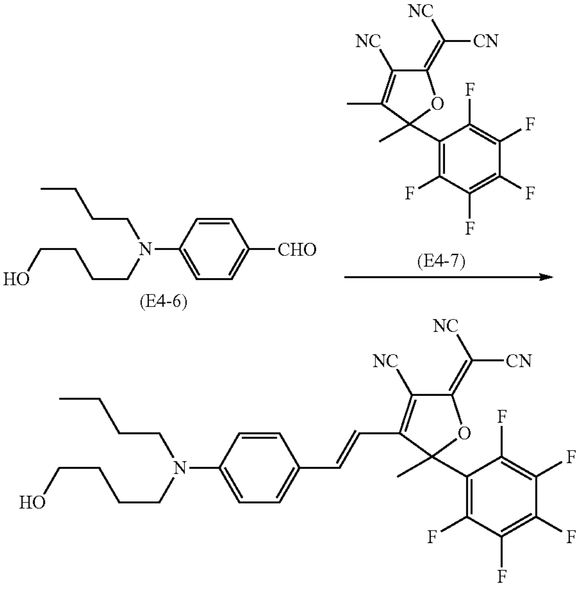

(E4-6)

(E4-7)

(E-4)

Under an Ar atmosphere, the solution of the compound (E4-6) (3.24 g (13.0 mmol)), the compound (E4-7) (3.51 g (10.0 mmol)) and EtOH (100 mL) was heated to 37° C. to 45° C., stirred for five hours and then cooled with ice water. Precipitated crystals were filtered, washed with IPE and then dried under reduced pressure at 50° C., thereby obtaining 3.51 g of the compound (E-4) (yield: 93%).

$^{1}$H-NMR analysis and $^{13}$C-NMR analysis of the compound (E-4) were performed.

$^{1}$H-NMR DMSO-d6

0.97 (t 3H), 1.34-1.42 (m 3H), 1.57-1.65 (m 41H), 1.70-1.77 (m 2H), 2.19 (s 3H), 3.36-3.43 (m 2H), 3.43-3.49 (m 2H), 3.71 (d 2H), 6.65 (d 2H), 6.68 (d 1H), 7.25 (d 1H), 7.41 (d 2H)

$^{13}$C-NMR analysis DMSO-d6

13.67, 19.40, 23.72, 26.12, 29.09, 29.40, 50.11, 50.30, 51.58, 60.27, 89.82, 94.17, 107.05, 109.87, 111.80, 112.19, 112.46, 112.93, 121.49, 134.30, 137.58, 141.80, 145.47, 149.74, 152.92, 171.44, 176.74

(Preparation of Compound (E-5))

A compound (E-5) (4-[4-(N,N-butyl 4-hydroxybutyl)aminophenyl] 3-cyano-5,5-dimethylfuran-2(5H)-ylidene)malononitrile) was synthesized by the following procedure.

Synthesis of 2-methyl-trimethylsilyloxypropionitrile (E5-1)

[Chem. 15]

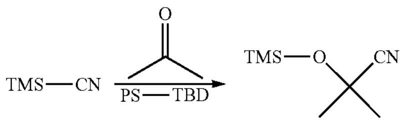

(E5-1)

1,5,7-Triazabicyclo[4,4,0] 5-decene polystyrene (PS-TBD) (100 mg (0.121 mmol)) was added to acetone (100 mL), and trimethylsilylcyanide (10.0 g (101 mmol)) was added dropwise at room temperature. After the reaction mixture was stirred at room temperature for three hours, PS-TBD was filtered, and acetone was concentrated under reduced pressure, thereby obtaining 14.4 g of a compound expressed by the formula (E5-1) (hereinafter, referred to as "compound (E5-1)" in some cases) (yield: 100%).

$^{1}$H-NMR analysis and $^{13}$C-NMR analysis of the compound (E5-1) were performed.

$^{1}$H-NMR $CDCl_3$: 0.24 (s 9H), 1.60 (s 6H)

$^{13}$C-NMR $CDCl_3$: 1.32, 30.89, 66.17, 122.79

Synthesis of 1-(4-fluorophenyl)-2-hydroxy-2-methylpropan-1-one (E5-2)

[Chem. 16]

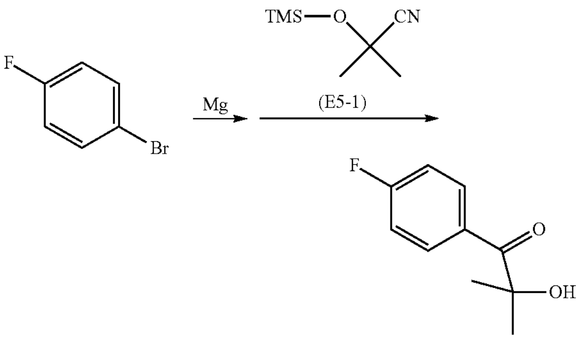

(E5-2)

THF (18 mL) was added to magnesium (3.22 g (132 mmol)) with several drops of 1,2-dibromoethane and a solution of 4-bromofluorobenzene (20.1 g (115 mmol)) diluted with THF (10 mL) was added dropwise while being cooled with water and stirred. After the solution was continuously stirred at room temperature for three hours, the solution of the compound (E5-1) (14.4 g (101 mmol)) and THF (20 mL) was added dropwise under water cooling. After stirred at room temperature for 16 hours, the solution was cooled under 10° C., and a 6 mol/L hydrochloric acid solution (110 mL) was slowly added dropwise. After the solution was stirred at room temperature for 2.5 hours, sodium bicarbonate (40 g) was added portionwise to the solution. The solution was extracted with ethyl acetate (300 mL) and 10% salt water (300 mL). The organic layer was washed with 10% salt water and then dried with anhydrous sodium sulfate, and the solvent was concentrated under reduced pressure, thereby obtaining a crude compound (E5-2) of a compound expressed by the formula (E5-2) (hereinafter, referred to as "compound (E5-2)" in some cases). The crude compound was purified by silica gel column chromatography (chloroform/ethyl acetate: 10/1) to obtain 10.6 g of the compound (E5-2) (yield: 58%).

Synthesis of 3-cyano-2-dicyanomethylene-4-(4-fluorophenyl)-5,5-dimethyl-2,5-dihydrofuran (E5-3)

[Chem. 17]

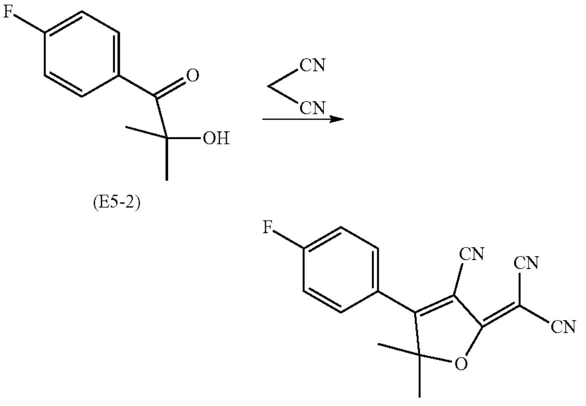

(E5-3)

The compound (E5-2) (10.6 g (58.1 mmol)) and malononitrile (11.5 g (174 mmol)) were dissolved in pyridine (45 mL), acetic acid (0.2 g) was added, and the reaction mixture was stirred at room temperature for five days. The reaction mixture was dispersed in water (900 mL), and precipitated crystals were filtered. The obtained crystals were washed with water and then with methanol and dried under reduced pressure at 70° C., thereby obtaining a compound expressed by the formula (E5-3) (hereinafter, referred to as "compound (ES-3)" in some cases) (12.0 g (43.0 mmol)).

On the compound (ES-3), $^{1}$H-NMR analysis and $^{13}$C-NMR analysis were performed, and the melting point was measured with a differential scanning calorimeter.

$^{1}$H-NMR DMSO-d6: 1.75 (s 6H), 7.53 (dd 2H), 7.91 (dd 2H)

$^{13}$C-NMR DMSO-d6:

24.50, 55.61, 100.60, 103.24, 110.99, 111.32, 112.19, 116.87, 123.91, 131.32, 163.69, 165.37, 177.01

DSC: mp 273° C.

<Synthesis of (E-5)>

[Chem. 18]

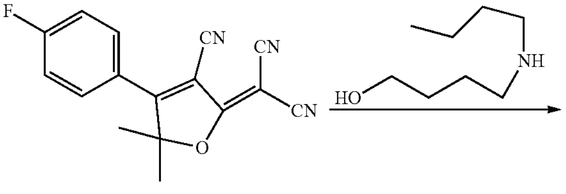

(E5-3)

-continued

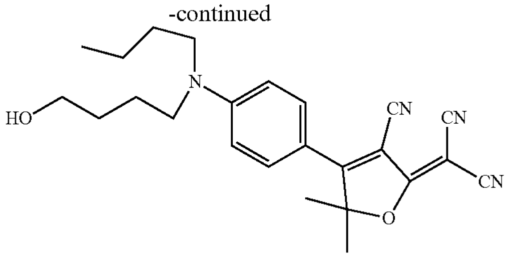

(E-5)

The compound (E5-3) (7.20 g (25.8 mmol)) and N,N-butyl 4-hydroxybutylamine (11.3 g (77.8 mmol)) were added to pyridine (130 mL) and acetonitrile (90 mL) and heated and stirred at an oil bath temperature of 50° C. for 22 hours. The solvent was concentrated under reduced pressure at 50° C. THF (450 mL) and ethyl acetate (450 mL) were added to and dissolved in a concentrate. This was washed with 10% salt water (600 mL) in which potassium carbonate (60 g) had been dissolved and then dried with anhydrous sodium sulfate, and the solvent was concentrated under reduced pressure, thereby obtaining a crude compound (E-5). The crude product was purified through silica gel column chromatography to obtain red crystals. This was washed with ethyl acetate and then with methanol, and dried under reduced pressure at 70° C. to obtain a compound (E-5) (6.01 g (14.8 mmol)) (yield: 57%).

On the compound (E-5), $^{1}$H-NMR analysis, $^{13}$C-NMR analysis and mass analysis were performed, and the melting point was measured with a differential scanning calorimeter.

$^{1}$H-NMR DMSO-d6

0.93 (t 3H), 1.35 (m 2H), 1.48 (m 2H), 1.53-1.65 (m 4H), 1.81 (s 6H), 3.43-3.49 (m 6H), 4.49 (t 1H), 6.92 (d 2H), 8.05 (d 2H)

$^{13}$C-NMR DMSO-d6

13.67, 19.41, 23.61, 26.60, 28.95, 29.41, 50.04, 50.21, 50.38, 60.27, 88.90, 98.12, 112.12, 112.35, 112.57, 113.63, 113.69, 132.60, 152.77, 173.98, 177.81

DSC: mp 249.8° C.

ESI-MS: M+1=405.2

(Synthesis of Base Polymer (A-1))

24.15 g (241.2 mmol) of methyl methacrylate (MMA), 10.65 g (68.64 mmol) of 2-(isocyanatoethyl) methacrylate (MOI) and 1.53 g (9.32 mmol) of azobisisobutyronitrile (AIBN) were dissolved in 57 mL of dehydrated toluene, argon was encapsulated, and then the solution was stirred in an oil bath at 60° C. for two hours. The reaction mixture was cooled to room temperature and then added dropwise to 1420 mL of dehydrated diisopropyl ether (IPE) to filter the precipitate. The precipitate was washed with dehydrated IPE and dried under reduced pressure at 70° C., thereby obtaining 24.1 g of a base polymer (A-1).

(Derivatization of Base Polymer (A-1) (Methyl Carbamate Derivative))

Under Ar gas, 7.0 g of the base polymer (A-1) was dissolved in 245 mL of dehydrated tetrahydrofuran, 15 mL of dehydrated methanol and 280 μL of dibutyltin dilaurate (DBTDL) were added, and the solution was stirred in an oil bath at 60° C. for two hours. The reaction mixture was cooled, then, poured into 2.8 L of diisopropyl ether (IPE) and stirred. A precipitated powder was filtered, washed with IPE and dried under reduced pressure at 70° C., thereby obtaining the derivative of the base polymer (A-1).

Regarding the obtained derivative, as a result of measuring 10 mg of a measurement specimen and a reference specimen using a differential scanning calorimetry measuring instrument (Rigaku Thermo plus DSC 8230, manufactured by Rigaku Corporation) under conditions of an Al empty container, a nitrogen atmosphere and a rate of temperature increase of 10° C./minute, the glass transition temperature Tg was 97° C. In addition, as a result of obtaining the molecular weights by GPC in which Alliance e2695 (manufactured by Nihon Waters K.K.) was used (column: Shodex GPC KF-804L (8 mmϕ×300 mm), developing solvent: THF, column temperature: 40° C.), the weight-average molecular weight Mw was 76300, and the number-average molecular weight Mn was 35500.

(Synthesis of Base Polymer (A-2))

7.90 g (78.9 mmol) of methyl methacrylate (MMA), 3.32 g (21.4 mmol) of 2-(isocyanatoethyl) methacrylate (MOI) and 0.497 g (3.03 mmol) of azobisisobutyronitrile (AIBN) were dissolved in 15 mL of dehydrated toluene, argon was encapsulated, and then the solution was stirred in an oil bath at 60° C. for two hours. The reaction mixture was cooled to room temperature, diluted with 5 mL of dehydrated toluene and then added dropwise to 450 mL of dehydrated diisopropyl ether (IPE) to filter a precipitate. The precipitate was washed with dehydrated IPE and dried under reduced pressure at 70° C., thereby obtaining 10.68 g of a base polymer (A-2).

As a result of obtaining a derivative of the base polymer (A-2) in the same manner as in the procedure of the derivatization of the base polymer (A-1) and analyzing the derivative, the glass transition temperature Tg was 97° C., the weight-average molecular weight Mw was 75500, and the number-average molecular weight Mn was 30200.

(Synthesis of Base Polymer (A-3))

3.95 g (39.5 mmol) of methyl methacrylate (MMA), 1.66 g (10.7 mmol) of 2-(isocyanatoethyl) methacrylate (MOI) and 0.247 g (1.50 mmol) of azobisisobutyronitrile (AIBN) were dissolved in 10 mL of dehydrated toluene, argon was encapsulated, and then the components were stirred in an oil bath at 60° C. for 2.5 hours. The reaction mixture was cooled to room temperature, diluted with 10 mL of dehydrated toluene and then added dropwise to 250 mL of dehydrated diisopropyl ether (IPE) to filter the precipitate. The precipitate was washed with dehydrated IPE and dried under reduced pressure at 70° C., thereby obtaining 3.70 g of a base polymer (A-3).

As a result of obtaining a derivative of the base polymer (A-3) in the same manner as in the procedure of the derivatization of the base polymer (A-1) and analyzing the derivative, the glass transition temperature Tg was 98° C., the weight-average molecular weight Mw was 64800, and the number-average molecular weight Mn was 31400.

(Synthesis of Base Polymer (A-4))

7.50 g (74.9 mmol) of methyl methacrylate (MMA), 3.00 g (19.3 mmol) of 2-(isocyanatoethyl) methacrylate (MOI) and 0.464 g (2.83 mmol) of azobisisobutyronitrile (AIBN) were dissolved in 15 mL of dehydrated toluene, argon was encapsulated, and then the solution was stirred in an oil bath at 60° C. to 61° C. for three hours. The reaction mixture was cooled to room temperature and then added dropwise to 450 mL of dehydrated diisopropyl ether (IPE) to filter the precipitate. The precipitate was washed with dehydrated IPE and dried under reduced pressure at 50° C., thereby obtaining 8.48 g of a base polymer (A-4).

As a result of obtaining a derivative of the base polymer (A-4) in the same manner as in the procedure of the derivatization of the base polymer (A-1) and analyzing the derivative, the glass transition temperature Tg was 99° C., the weight-average molecular weight Mw was 76900, and the number-average molecular weight Mn was 32100.

(Synthesis of Base Polymer (A-5))

7.90 g (78.9 mmol) of methyl methacrylate (MMA), 3.32 g (21.4 mmol) of 2-(isocyanatoethyl) methacrylate (MOI) and 0.497 g (3.03 mmol) of azobisisobutyronitrile (AIBN) were dissolved in 15 mL of dehydrated toluene, argon was encapsulated, and then the solution was stirred in an oil bath at 60° C. for two hours. The reaction mixture was cooled to room temperature, diluted with dehydrated toluene (8 mL) and then added dropwise to 450 mL of dehydrated diisopropyl ether (IPE) to filter the precipitate. The precipitate was washed with dehydrated IPE and dried under reduced pressure at 70° C., thereby obtaining 8.325 g of a base polymer (A-5).

As a result of obtaining a derivative of the base polymer (A-5) in the same manner as in the procedure of the derivatization of the base polymer (A-1) and analyzing the derivative, the glass transition temperature Tg was 99° C., the weight-average molecular weight Mw was 83400, and the number-average molecular weight Mn was 36900.

(Manufacturing of EO Polymer (EO-1))

4.70 g of the base polymer (A-1) obtained above was dissolved in 190 mL of dehydrated tetrahydrofuran (THF). 2.10 g (3.04 mmol) of the compound (E-1) and 150 μL of dibutyltin dilaurate (DBTDL) were added to this, and the solution was stirred in an oil bath at 60° C. for two hours. Next, 10 mL of dehydrated methanol and 60 μL of DBTDL were added and stirred at 60° C. for 30 minutes. The reaction mixture was cooled, then, poured into 1500 mL of diisopropyl ether (IPE) and stirred. A precipitated powder was filtered, washed with IPE (I L) and dried under reduced pressure at 70° C. 2.83 g of the EO polymer (EO-1) was obtained as a black powder (glass transition temperature Tg: 131° C.).

(Manufacturing of EO Polymer (EO-2))

1.75 g of the base polymer (A-2) obtained above was dissolved in 105 mL of dehydrated tetrahydrofuran (THF). 0.7505 g (0.969 mmol) of the compound (E-2) and 100 μL of dibutyltin dilaurate (DBTDL) were added to this, and the solution was stirred in an oil bath at 60° C. for two hours. Next, 5 mL of dehydrated methanol was added and stirred at 60° C. for 30 minutes. The reaction mixture was cooled, then, poured into 1050 mL of diisopropyl ether (IPE) and stirred. A precipitated powder was filtered, washed with IPE (300 mL) and dried under reduced pressure at 70° C. 1.746 g of the EO polymer (EO-2) was obtained as a black powder (glass transition temperature Tg: 127° C.).

(Manufacturing of EO Polymer (E-3))

2.00 g of the base polymer (A-3) obtained above was dissolved in 80 mL of dehydrated tetrahydrofuran (THF). 2.00 g (3.06 mmol) of the compound (E-3) and 40 μL of dibutyltin dilaurate (DBTDL) were added to this, and the solution was stirred in an oil bath at 60° C. for three hours. Next, 4 mL of dehydrated methanol was added and stirred at 60° C. for 30 minutes. The reaction mixture was cooled, then, poured into 900 mL of diisopropyl ether (IPE) and stirred. A precipitated powder was filtered, washed twice with IPE (100 mL) and dried under reduced pressure at 70° C. 2.83 g of the EO polymer (EO-3) was obtained as a bluish purple powder (glass transition temperature Tg: 126° C.).

(Manufacturing of EO Polymer (EO-4))

1.05 g of the base polymer (A-4) obtained above was dissolved in 65 mL of dehydrated tetrahydrofuran (THF). 0.90 g (0.77 mmol) of the compound (E-4) and 30 μL of dibutyltin dilaurate (DBTDL) were added to this, and the solution was stirred in an oil bath at 60° C. for two hours. Next, 3 mL of dehydrated methanol was added and stirred at 60° C. for 45 minutes. The reaction mixture was cooled, then, poured into 650 mL of diisopropyl ether (IPE) and stirred. A precipitated powder was filtered, washed twice with IPE (100 mL) and dried under reduced pressure at 50° C. 1.29 g of the EO polymer (EO-4) was obtained as a black powder (glass transition temperature Tg: 146° C.).

(Manufacturing of EO Polymer (EO-5))

1.754 g (3.35 mmol) of the base polymer (A-5) obtained above was dissolved in 105 mL of dehydrated tetrahydrofuran (THF). 0.754 g (1.86 mmol) of the compound (E-5) and 100 μL of dibutyltin dilaurate (DBTDL) were added to this, and the solution was stirred in an oil bath at 55° C. for two hours. Next, 5 mL of dehydrated methanol was added and stirred at 60° C. for 120 minutes. The reaction mixture was cooled, then, poured into 1050 mL of diisopropyl ether (IPE) and stirred. A precipitated powder was filtered, washed three times with IPE (100 mL) and dried under reduced pressure at 70° C. 1.66 g of the EO polymer (EO-5) was obtained as a reddish orange powder (glass transition temperature Tg: 120° C.).

(Determination of Figure of Merit FOM1 and Figure of Merit FOM2)

Upon the calculation of the figures of merit FOM1 and FOM2, films of the EO polymers were formed by the following procedure, and the propagation loss per unit length α, refractive index n and electro-optic coefficient r of the EO polymers (EO-1) to (EO-5) were measured.

[Film-Forming Method of EO Polymer]

A solution in which the concentration was adjusted to 1 to 20 weight % by adding each of the EO polymers (EO-1) to (EO-5) to cyclohexanone was applied to a cleaned substrate (quartz glass) using a spin coater 1H-DX2 manufactured by MIKASA CO., LTD under a condition of 500 to 6000 rotations/minute and then dried at near the glass transition temperature (Tg) in a vacuum for one hour. Conditions of the concentration of the polymer solution and the rotation speed of the spin coater were appropriately selected so as to obtain a desired film thickness.

[Absorbance Spectrum of Thin Film of EO Polymer]

The absorbance spectrum of a thin film of each of the EO polymers (EO-1) to (EO-5) having a film thickness of approximately 0.15 m, which had been formed on the quartz glass by the above-described film-forming method, was measured using a spectrophotometer UH-4150 manufactured by Hitachi High-Tech Science Corporation. The absorbance was divided by the film thickness, thereby calculating the absorption coefficient per unit length a (ω).

[Absorbance Spectrum of Thick Film of EO Polymer]

Indents with three kinds of depths were formed in a range of 40 to 350 μm on quartz glass and filled with the EO polymer, and the surface was polished, thereby producing thick films of the EO polymer with three kinds of film thicknesses regarding each of the EO polymers (EO-1) to (EO-5). The absorbance spectrum of the thick film of the EO polymer with each film thickness was measured using the spectrophotometer UH-4150 manufactured by Hitachi High-Tech Science Corporation. A graph where the absorbance was plotted with respect to each film thickness at individual wavelengths (frequencies ω) was approximated by a linear function, and the absorption coefficient per unit length a (ω) at the frequency ω was calculated from the slope.

[Propagation Loss Per Unit Length α of EO Polymer]

The propagation loss per unit length of an optical waveguide (0.4 dB/cm) calculated by simulation was added to the absorption coefficient a (ω), and the propagation loss per unit length α (ω) was obtained. Regarding the absorption coefficient a (ω), for values of less than $1\times10^{-3}$ among the measurement values of the absorbance spectrum of the thin film, errors were large due to the limitation of the measuring instrument, and thus, at wavelengths at which the absorbance of the thin film was $1\times10^{-3}$ or more (frequency ω), the values of the absorption coefficient a (ω) calculated from the absorbance of the thin film were used, and, at wavelengths at which the absorbance of the thin film was less than $1\times10^{-3}$ (frequency ω), the values of the absorption coefficient a (ω) calculated from the absorbance of the thick film were used.

[Refractive Index of EO Polymer]

The refractive index n of each of the EO polymers (EO-1) to (EO-5) was measured from the EO polymer film having a film thickness of approximately 3 μm formed on the quartz glass using Prism Coupler 2010/M manufactured by Metricon Corporation.

[Electro-Optic Coefficient r of EO Polymer]

The EO coefficient was measured in the same manner as in the method described in a reference thesis ("Transmission ellipsometric method without an aperture for simple and reliable evaluation of electro-optic properties", Toshiki Yamada and Akira Otomo, Optics Express, vol. 21, pages 29240-48(2013)). As laser light sources, DFB laser 81663A manufactured by Agilent Technologies, Inc. (wavelengths: 1308 nm and 1550 nm), DFB pro laser manufactured by TOPTICA Photonics AG (wavelength: 976 nm) and OBIS LX laser manufactured by Coherent, Inc. (wavelength: 640 nm) were used.

[Calculation of Figures of Merit FOM1 and FOM2 Based on Homogeneous Broadening Analysis (Lorentzian Distribution Formula)]

Upon the calculation of the figures of merit FOM1 and FOM2 based on homogeneous broadening analysis (Lorentzian distribution formula), the following formula (Q1) and formula (Q2) were used as the model formulae of the linear susceptibility $\chi^{(1)}$ (ω) and the second-order nonlinear susceptibility $\lambda^2$ (ω, ω, 0). In the formulae, ω is the frequency, $\omega_0$ is the resonant frequency, $\Gamma_0$ is the homogeneous broadening width, $\chi_0^{(1)}$ is the linear susceptibility of the zero frequency, and $\chi_0^{(2)}$ is the second-order nonlinear susceptibility of the zero frequency.

[Math 6]

$$\chi^{(1)}(\omega) = \frac{\chi_0^{(1)}\omega_0^2}{\omega_0^2 - \omega^2 - 2i\Gamma_0\omega} \tag{Q1}$$

$$\chi^{(2)}(\omega, \omega, 0) = \frac{\chi_0^{(2)}\omega_0^6}{(\omega_0^2 - \omega^2 - 2i\Gamma_0\omega)^2\omega_0^2} \tag{Q2}$$

The value measured in the section [Absorbance Spectrum of Thin Film of EO polymer] was fitted with the following formula (Q3) and formula (Q4), thereby determining the linear susceptibility $\chi_0^{(1)}$ of the zero frequency, the resonant frequency $\omega_0$ and the homogeneous broadening width $\Gamma_0$. In the formula (Q3) and the formula (Q4), $\varepsilon_r$ (ω) is the dielectric constant at the frequency ω, c is the light velocity, and a (ω) is the absorption coefficient at the frequency ω.

[Math 7]

$$\varepsilon_r(\omega) = 1 + \chi_b^{(1)} + \chi^{(1)}(\omega) \tag{Q3}$$

-continued $$a(\omega) = \frac{2\omega}{c}\left[\frac{|\varepsilon_r(\omega)| - \mathrm{Re}[\varepsilon_r(\omega)]}{2}\right]^{1/2} \tag{Q4}$$

Next, the values at wavelengths of 1308 nm and 1532 nm measured in the section [Refractive Index of EO polymer] were fitted with the following formula (Q5), thereby determining the background term $\chi_b^{(1)}$ of the linear susceptibility. In the following formula, n (ω) is the refractive index at the frequency ω.

[Math 8]

$$n(\omega) = \left[\frac{|\varepsilon_r(\omega)| + \mathrm{Re}[\varepsilon_r(\omega)]}{2}\right]^{1/2} \tag{Q5}$$

The fitting of the absorption spectrum and the fitting of the refractive index were repeated until the amount of $\chi_b^{(1)}$ changed became $1\times10^{-6}$ or less, and $\chi_0^{(1)}$, $\omega_0$, $\Gamma_0$ and $\chi_0^{(1)}$ were finally determined.

Subsequently, the values at wavelengths of 1308 nm and 1550 nm measured in the section [Electro-Optic Coefficient r of EO Polymer] for the EO polymers (EO-1) and (EO-2), the values at wavelengths of 976 nm, 1308 nm and 1550 nm for the EO polymer (EO-3), the values at wavelengths of 976 nm, 1308 nm and 1550 nm for the EO polymer (EQ-4) and the values at wavelengths of 640 nm, 976 nm, 1308 nm and 1550 nm for the EO polymer (EO-5) were fitted with the formula (Q2) and the following formula (Q6), respectively, and the second-order nonlinear susceptibility $\chi_0^{(2)}$ at the zero frequency was determined. The fitting was performed using a nonlinear least-squares method (Levenberg-Marquardt method).

[Math 9]

$$r(\omega) = -\frac{2\mathrm{Re}[\chi^{(2)}(\omega, \omega, 0)]}{n^4(\omega)} \tag{Q6}$$

Figure 5:
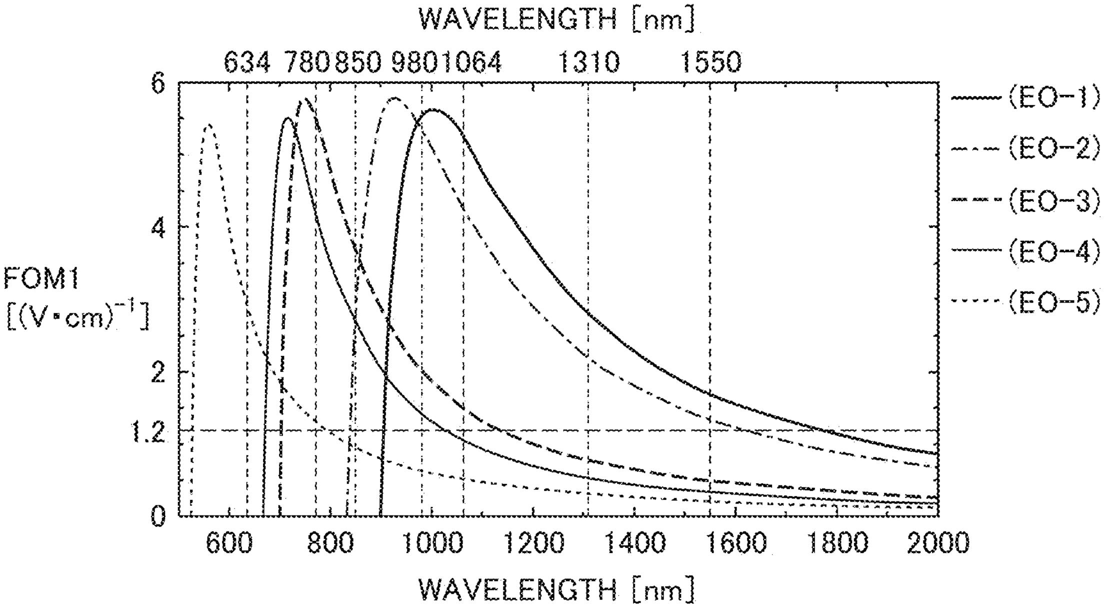
FIG. 5 is a graph showing figure of merit FOM1 with respect to wavelengths regarding electro-optic polymers obtained in Examples.
Figure 6:
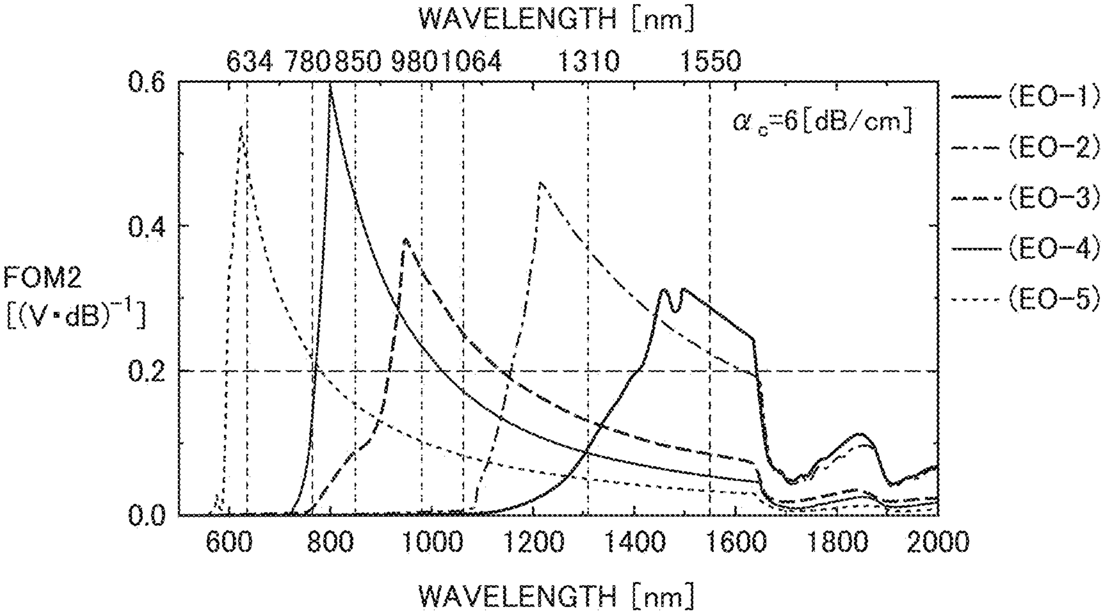
FIG. 6 is a graph showing figure of merit FOM2 with respect to the wavelengths regarding the electro-optic polymers obtained in the Examples.
Figure 7:
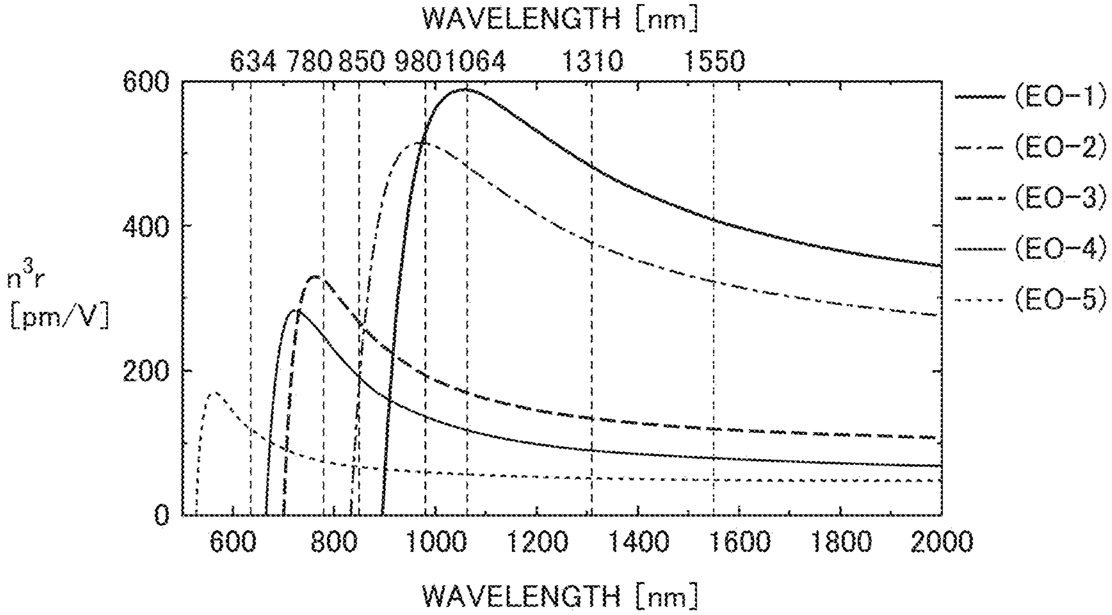
FIG. 7 is a graph showing figure $n^3r$, which has been conventionally used, with respect to the wavelengths regarding the electro-optic polymers obtained in the Examples.
Figure 8:
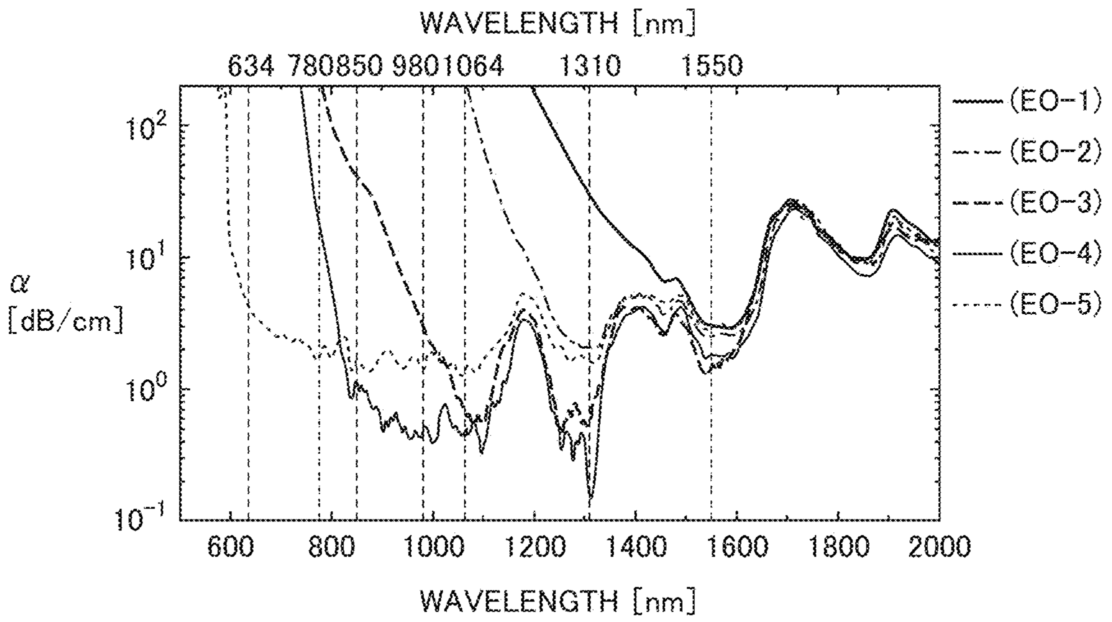
FIG. 8 is a graph showing figure α, which has been conventionally used, with respect to the wavelengths regarding the electro-optic polymers obtained in the Examples.

For the EO polymers (EO-1) to (EO-5) obtained above, the refractive index n and the electro-optic coefficient r were determined from the relational formulae obtained above, and the figures of merit FOM1 and FOM2 were calculated using the measurement values as the propagation loss per unit length α. Upon the calculation of the figure of merit FOM2, in the case of $\alpha\leq\alpha_c$, $\alpha_c$ was used as α, and, in the case of $\alpha>\alpha_c$, α was used. The results are shown in Table 2, FIG. 5 and FIG. 6. In addition, regarding the EO materials (E-1) to (E-5), the calculation results of the conventionally used figures $n^3r$ and α are shown in FIG. 7 and FIG. 8.

TABLE 2

| Kind of EO material | Wavelength λ [nm] | Refractive index n | Electro-optic coefficient r [pm/V] | Propagation loss per unit length α [dB/cm] | $n^3r$ [pm/V] | Figure of merit FOM1 $n^3r/\lambda^2$ $[(V \cdot cm)^{-1}]$ | Figure of merit FOM2 $n^3r/\alpha\lambda^2$ $[(V \cdot dB)^{-1}]$ $\alpha_c = 0$ | $\alpha_c = 6$ |
|---|---|---|---|---|---|---|---|---|
| (EO-1) | 850 | 1.680 | −184 | $1.6 \times 10^5$ | −871 | −12 | $-7.4 \times 10^{-5}$ | $-7.4 \times 10^{-5}$ |
| | 980 | 1.687 | 110 | $4.3 \times 10^4$ | 529 | 5.5 | $1.3 \times 10^{-4}$ | $1.3 \times 10^{-4}$ |
| | 1064 | 1.673 | 125 | $6.5 \times 10^3$ | 587 | 5.2 | $8.0 \times 10^{-4}$ | $8.0 \times 10^{-4}$ |
| | 1310 | 1.645 | 108 | 30 | 482 | 2.8 | $9.3 \times 10^{-2}$ | $9.3 \times 10^{-2}$ |
| | 1550 | 1.631 | 94.0 | 3.5 | 408 | 1.7 | 0.48 | 0.28 |
| (EO-2) | 850 | 1.651 | 42 | $8.8 \times 10^3$ | 189 | 2.6 | $3.0 \times 10^{-5}$ | $3.0 \times 10^{-5}$ |
| | 980 | 1.633 | 118 | $8.1 \times 10^3$ | 514 | 5.4 | $6.6 \times 10^{-4}$ | $6.6 \times 10^{-4}$ |
| | 1064 | 1.622 | 113 | 744 | 481 | 4.3 | $5.7 \times 10^{-3}$ | $5.7 \times 10^{-3}$ |
| | 1310 | 1.603 | 91.4 | 2.5 | 376 | 2.2 | 0.89 | 0.37 |
| | 1550 | 1.594 | 79.6 | 2.9 | 322 | 1.3 | 0.46 | 0.22 |
| (EO-3) | 850 | 1.718 | 52.5 | 42 | 266 | 3.7 | $8.8 \times 10^{-2}$ | $8.8 \times 10^{-2}$ |
| | 980 | 1.674 | 41.2 | 3.6 | 193 | 2.0 | 0.56 | 0.34 |
| | 1064 | 1.658 | 36.9 | 1.1 | 168 | 1.5 | 1.4 | 0.25 |
| | 1310 | 1.635 | 30.5 | 0.99 | 133 | 0.78 | 0.79 | 0.13 |
| | 1550 | 1.624 | 27.8 | 1.9 | 119 | 0.50 | 0.24 | $8.3 \times 10^{-2}$ |
| (EO-4) | 640 | 1.656 | −169 | $3.1 \times 10^5$ | −768 | −19 | $-6.0 \times 10^{-5}$ | $-6.0 \times 10^{-5}$ |
| | 850 | 1.596 | 47.1 | 1.5 | 191 | 2.6 | 1.8 | 0.44 |
| | 980 | 1.572 | 35.1 | 0.93 | 136 | 1.4 | 1.5 | 0.24 |
| | 1064 | 1.564 | 30.7 | 0.85 | 118 | 1.0 | 1.2 | 0.17 |
| | 1310 | 1.550 | 24.3 | 0.55 | 90.4 | 0.53 | 0.97 | $8.8 \times 10^{-2}$ |
| | 1550 | 1.544 | 21.5 | 2.2 | 79 | 0.33 | 0.15 | $5.5 \times 10^{-2}$ |
| (EO-5) | 640 | 1.617 | 27.3 | 4.4 | 115 | 2.8 | 0.64 | 0.47 |
| | 850 | 1.569 | 17.5 | 2.1 | 67.4 | 0.93 | 0.45 | 0.16 |
| | 980 | 1.559 | 15.8 | 1.8 | 59.8 | 0.62 | 0.35 | 0.10 |
| | 1064 | 1.555 | 15.1 | 1.8 | 57 | 0.50 | 0.27 | $8.4 \times 10^{-2}$ |
| | 1310 | 1.549 | 14.1 | 2.3 | 52.5 | 0.31 | 0.13 | $5.1 \times 10^{-2}$ |
| | 1550 | 1.546 | 13.7 | 3.4 | 50.5 | 0.21 | $6.1 \times 10^{-2}$ | $3.5 \times 10^{-2}$ |

[Calculation of Figures of Merit FOM1 and FOM2 Based on Inhomogeneous Broadening Analysis (Gaussian Distribution Formula)]

Upon the calculation of the figures of merit FOM1 and FOM2 based on inhomogeneous broadening analysis (Gaussian distribution formula), the following formula was used as the model formulae of the linear susceptibility $\chi^{(1)}(\omega)$ and the second-order nonlinear susceptibility $\chi^{(2)}(\omega, \omega, 0)$. In the formula, ω is the frequency, m is the order of resonance, $\omega_{m0}$ is the resonant frequency, $\Gamma_{m0}$ is the homogeneous broadening width, $\Delta\omega_{m0}$ is the inhomogeneous broadening width, $\chi m^{(1)}$ is the magnitude of linear susceptibility, and $\chi m^{(2)}$ is the magnitude of second-order nonlinear susceptibility. The order of resonance m can be appropriately selected from the degree of reproducibility (the difference between the measurement value and the computation value) of the absorbance spectrum; however, in the present Examples, m=4 was assumed in analyses.

[Math 10]

$$\chi^{(1)}(\omega) = \sum_m \frac{\chi_m^{(1)}}{\Delta\omega_{m0}\sqrt{\pi}} \int_{-\infty}^{\infty} \left[\frac{1}{\omega'_{m0} - \omega - i\Gamma_{m0}} + \frac{1}{\omega'_{m0} + \omega + i\Gamma_{m0}}\right] \exp\left[-\left(\frac{\omega'_{m0} - \omega_{m0}}{\Delta\omega_{m0}}\right)^2\right] d(\omega'_{m0} - \omega_{m0})$$

$$\chi^{(2)}(\omega, \omega, 0) = \sum_m \frac{\chi_m^{(2)}}{\Delta\omega_{m0}\sqrt{\pi}} \int_{-\infty}^{\infty} \left\{\frac{2}{\omega'_{m0}}\left[\frac{1}{\omega'_{m0} - \omega - i\Gamma_{m0}} + \frac{1}{\omega'_{m0} + \omega + i\Gamma_{m0}}\right] + \left(\frac{1}{\omega'_{m0} - \omega - i\Gamma_{m0}}\right)^2 + \left(\frac{1}{\omega'_{m0} + \omega + i\Gamma_{m0}}\right)^2\right\} \times \exp\left[-\left(\frac{\omega'_{m0} - \omega_{m0}}{\Delta\omega_{m0}}\right)^2\right] d(\omega'_{m0} - \omega_{m0})$$

The value measured in the section [Absorbance Spectrum of Thin Film of EO Polymer] was fitted with the formula (Q3) and formula (Q4), thereby determining the magnitude $\chi m^{(1)}$ of linear susceptibility, the resonant frequency $\omega_{m0}$, the homogeneous broadening width $\Gamma_{m0}$ and the inhomogeneous broadening width $\Delta\omega_{m0}$.

Next, the values at wavelengths of 1308 nm and 1532 nm measured in the section [Refractive Index of EO Polymer] were fitted with the formula (Q5), thereby determining the background term $\chi b^{(1)}$ of the linear susceptibility.

The fitting of the absorption spectrum and the fitting of the refractive index were repeated until the amount of $\chi b^{(1)}$ changed became $1\times10^{-6}$ or less, and $\chi m^{(1)}$, $\omega_{m0}$, $\Gamma_{m0}$, $\Delta\omega_{m0}$ and $\chi_b^{(1)}$ were finally determined.

Subsequently, the values at wavelengths of 1308 nm and 1550 nm measured in the section [Electro-Optic Coefficient r of EO Polymer] for the EO polymers (EO-1) and (EO-2), the values at wavelengths of 976 nm, 1308 nm and 1550 nm for the EO polymer (EO-3), the values at wavelengths of 976 nm, 1308 nm and 1550 nm for the EO polymer (EQ-4) and the values at wavelengths of 640 nm, 976 nm, 1308 nm and 1550 nm for the EO polymer (EO-5) were fitted with the formula (Q6), respectively, and the magnitudes $\chi_m^{(2)}$ of second-order nonlinear susceptibility were determined. The fitting was performed using a nonlinear least-squares method (Levenberg-Marquardt method).

For the EO polymers (EO-1) to (EO-5) obtained above, the refractive index n and the electro-optic coefficient r were determined from the relational formulae obtained above, and the figures of merit FOM1 and FOM2 were calculated using the measurement values as the propagation loss per unit length α. Upon the calculation of the figure of merit FOM2, in the case of $\alpha \le \alpha_c$, $\alpha_c$ was used as α, and, in the case of $\alpha > \alpha_c$, α was used. The results are shown in Table 3. Table 4 shows the maximum values (λmax) and minimum values (λmin) of the wavelengths at which the figure of merit FOM1 calculated above reaches 1.2 $(V{\cdot}cm)^{-1}$ or more and the maximum values (λmax) and minimum values (Amin) of the wavelengths at which the figure of merit FOM2 reaches 0.20 $(V{\cdot}dB)^{-1}$ or more.

TABLE 3

| Kind of EO material | Wavelength λ [nm] | Refractive index n | Electro-optic coefficient r [pm/V] | Propagation loss per unit length α [dB/cm] | $n^3r$ [pm/V] | Figure of merit FOM1 $n^3r/\lambda^2$ $[(V \cdot cm)^{-1}]$ | Figure of merit FOM2 $n^3r/\alpha\lambda^2$ $[(V \cdot dB)^{-1}]$ $\alpha_c = 0$ | $\alpha_c = 6$ |
|---|---|---|---|---|---|---|---|---|
| (EO-1) | 850 | 1.706 | −137 | $1.6 \times 10^5$ | −682 | −9.4 | $-5.8 \times 10^{-5}$ | $-5.8 \times 10^{-5}$ |
| | 980 | 1.779 | 246 | $4.3 \times 10^4$ | 1387 | 14 | $3.3 \times 10^{-4}$ | $3.3 \times 10^{-4}$ |
| | 1064 | 1.724 | 271 | $6.5 \times 10^3$ | 1391 | 12 | $1.9 \times 10^{-3}$ | $1.9 \times 10^{-3}$ |
| | 1310 | 1.648 | 115 | 30 | 514 | 3.0 | 0.1 | 0.1 |
| | 1550 | 1.627 | 85.4 | 3.5 | 368 | 1.5 | 0.44 | 0.26 |
| (EO-2) | 850 | 1.719 | 68.3 | $8.8 \times 10^4$ | 347 | 4.8 | $5.5 \times 10^{-5}$ | $5.5 \times 10^{-5}$ |
| | 980 | 1.680 | 279 | $8.1 \times 10^3$ | 1321 | 14 | $1.7 \times 10^{-3}$ | $1.7 \times 10^{-3}$ |
| | 1064 | 1.642 | 183 | 744 | 809 | 7.1 | $9.6 \times 10^{-3}$ | $9.6 \times 10^{-3}$ |
| | 1310 | 1.605 | 94.8 | 2.5 | 392 | 2.3 | 0.93 | 0.38 |
| | 1550 | 1.591 | 75.5 | 2.9 | 304 | 1.3 | 0.44 | 0.21 |
| (EO-3) | 850 | 1.717 | 62.4 | 42 | 316 | 4.4 | 0.11 | 0.11 |
| | 980 | 1.671 | 42.2 | 3.6 | 197 | 2.0 | 0.57 | 0.34 |
| | 1064 | 1.657 | 36.9 | 1.1 | 168 | 1.5 | 1.4 | 0.25 |
| | 1310 | 1.635 | 30.5 | 0.99 | 133 | 0.77 | 0.78 | 0.13 |
| | 1550 | 1.624 | 27.8 | 1.9 | 119 | 0.50 | 0.27 | $8.3 \times 10^{-2}$ |
| (EO-4) | 640 | 1.698 | −176 | $3.1 \times 10^5$ | −863 | −21 | $-6.8 \times 10^{-5}$ | $-6.8 \times 10^{-5}$ |
| | 850 | 1.595 | 51.5 | 1.5 | 209 | 2.9 | 1.9 | 0.48 |
| | 980 | 1.572 | 34.8 | 0.93 | 135 | 1.4 | 1.5 | 0.23 |
| | 1064 | 1.563 | 30. | 0.85 | 115 | 1.0 | 1.2 | 0.17 |
| | 1310 | 1.550 | 23.6 | 0.55 | 88.0 | 0.51 | 0.94 | $8.6 \times 10^{-2}$ |
| | 1550 | 1.544 | 21.0 | 2.2 | 77.4 | 0.32 | 0.15 | $5.4 \times 10^{-2}$ |
| (EO-5) | 640 | 1.616 | 27.3 | 4.4 | 115 | 2.8 | 0.64 | 0.47 |
| | 850 | 1.570 | 16.8 | 2.1 | 64.9 | 0.90 | 0.43 | 0.15 |
| | 980 | 1.560 | 15.5 | 1.8 | 58.9 | 0.61 | 0.34 | 0.10 |
| | 1064 | 1.557 | 15.0 | 744 | 56.7 | 0.50 | 0.27 | $8.3 \times 10^{-2}$ |
| | 1310 | 1.550 | 14.3 | 2.5 | 53.3 | 0.31 | 0.13 | $5.2 \times 10^{-2}$ |
| | 1550 | 1.546 | 14.0 | 2.9 | 51.8 | 0.22 | $6.3 \times 10^{-2}$ | $3.6 \times 10^{-2}$ |

TABLE 4

| Kind of EO material | | Wavelength at which figure of merit FOM1 becomes 1.2 $(V \cdot cm)^{-1}$ or more [nm] | Wavelength at which figure of merit FOM2 becomes 0.20 $(V \cdot dB)^{-1}$ or more [nm] $\alpha_c = 0$ | $\alpha_c = 6$ |
|---|---|---|---|---|
| (EO-1) | λmin | 906 | 1420 | 1420 |
| | λmax | 1670 | 1638 | 1638 |
| (EO-2) | λmin | 838 | 1144 | 1144 |
| | λmax | 1576 | 1642 | 1576 |
| (EO-3) | λmin | 688 | 914 | 914 |
| | λmax | 1130 | 1358 | 1130 |
| (EO-4) | λmin | 658 | 766 | 766 |
| | λmax | 1018 | 1168 | 1018 |
| (EO-5) | λmin | 526 | 600 | 600 |
| | λmax | 774 | 1106 | 774 |

[Chem. 19]

Example 6

As an optical control element, an optical modulator for use at a wavelength of 1550 nm was produced by the following procedure, and the figure of merit of optical modulation was evaluated.

(Preparation of EO Polymer (E-1a))

An EO polymer (E-1a) expressed by the following formula was prepared by the procedure described in Example 2 of WO 2018/003842. As the figure of merit at a wavelength of 1550 nm of the EO polymer (E-1a) calculated based on inhomogeneous broadening analysis (Gaussian dispersion formula), the figure of merit FOM1 was 1.33 $(V{\cdot}cm)^{-1}$, and the figure of merit FOM2 was 0.22 $(V{\cdot}dB)^{-1}$.

-continued (E-1a)

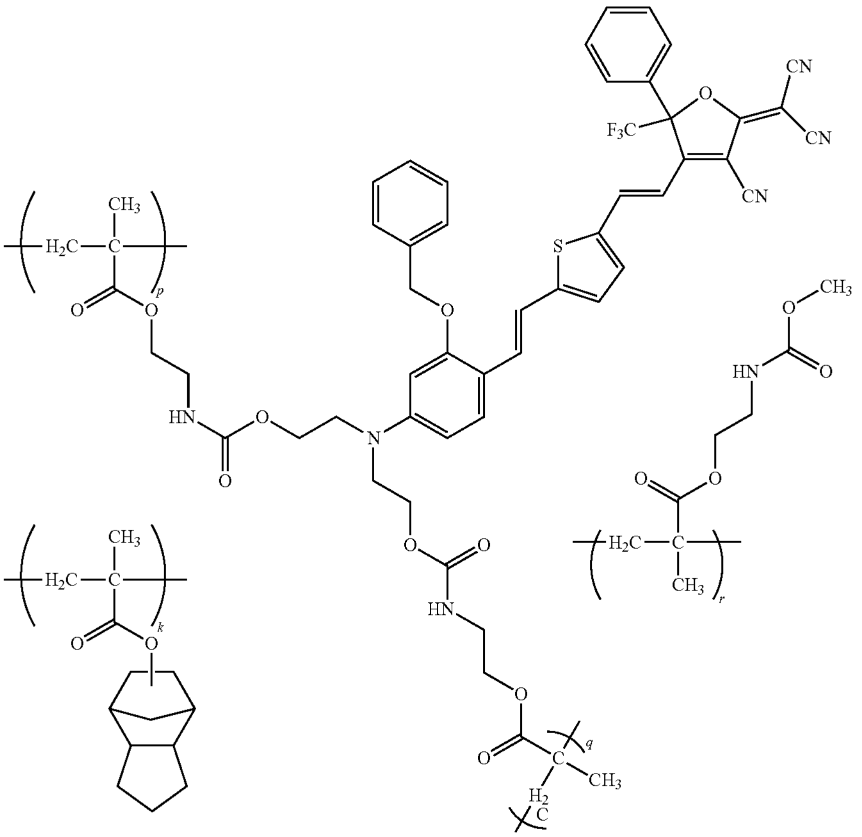

[In the formula, k, p, q and r represent an integer of 1 or more.]

(Preparation of Clad Material Composition)

0.67 g of 3-methacryloyloxypropyltrimethoxysilane (manufactured by Tokyo Chemical Industry Co., Ltd.) and 0.06 g of zirconium propoxide (manufactured by Tokyo Chemical Industry Co., Ltd.) were added to a solution mixture of 0.41 g of ethanol and 0.05 g of a 0.1 N hydrochloric acid aqueous solution and stirred. This mixture was held at a temperature of 5° C. or lower for 12 hours or more, and then 0.071 g of Omnirad 819 (manufactured by IGM Resins) was added and stirred for 30 minutes, thereby producing a clad material composition.

(Production of Lower Electrode)

An IZO film (100 nm) was formed on a thermal oxide film-attached silicon substrate having a thickness of 2 μm by a sputtering method to produce a lower electrode.

(Production of Lower Clad)

The clad material composition prepared above was applied onto the lower electrode by spin coating (3,500 rpm for 30 seconds), heated at a temperature of 95° C. for 30 minutes and at a temperature of 120° C. for 15 minutes, irradiated with LED light having a wavelength of 365 nm at a temperature of 100° C. and then heated at a temperature of 190° C. for 16 hours. The film thickness of a produced lower clad was 2.21 μm.

(Production of Core Layer)

A 15 mass % cyclohexanone solution of the EO polymer (E-1a) was applied to the lower clad produced above by spin coating (1,300 rpm for 30 seconds) and heated in a vacuum at a temperature of 180° C. for one hour. The film thickness of a produced core layer was 1.40 μm.

(Production of Electrode for Polling and Polling Treatment)

An IZO film (100 nm) was formed on the core layer produced above by the sputtering method, an electrode for polling was produced, and a structure for a polling treatment was obtained. The temperature of this structure was raised to a temperature of 176° C., then, a voltage of 420 V was applied between the lower electrode and the electrode for polling for three minutes, and a polling treatment was performed. The structure was cooled to room temperature under the application of the voltage, and then the voltage was turned off. After that, the electrode for polling was removed with an etching solution (ITO-06N manufactured by Kanto Chemical Co., Inc.).

(Formation of Optical Waveguide)

An IZO film (50 nm) was formed on the core layer of the structure on which the polling treatment had been performed as a mask for processing by the sputtering method. After that, a mask pattern was produced by photolithography, the core layer was processed into a rectangular structure (1.32 μm×1.40 μm) by a dry etching method in which a reactive ion etching apparatus was used, and this was used as an optical waveguide (core). The optical waveguide formed a Mach-Zehnder (MZ) type optical modulator structure.

(Production of Upper Clad)

The clad material composition prepared above was applied onto the optical waveguide formed above by spin coating (3,500 rpm for 30 seconds), heated at a temperature of 90° C. for 10 minutes, and then irradiated with LED light having a wavelength of 365 nm at a temperature of 100° C. for five minutes. The film thickness of the produced upper clad was 1.65 μm from the upper surface of the optical waveguide (core).

(Production of Upper Electrode)

An IZO film (100 nm) was formed on the upper clad layer produced above by the sputtering method. After that, a mask pattern was produced by photolithography, and the IZO film was patterned with an etching solution (ITO-06N manufactured by Kanto Chemical Co., Inc.), thereby forming an upper electrode. The length L of the upper electrode was set to 1 cm.

(Production of Optical Modulator)

Figure 9:
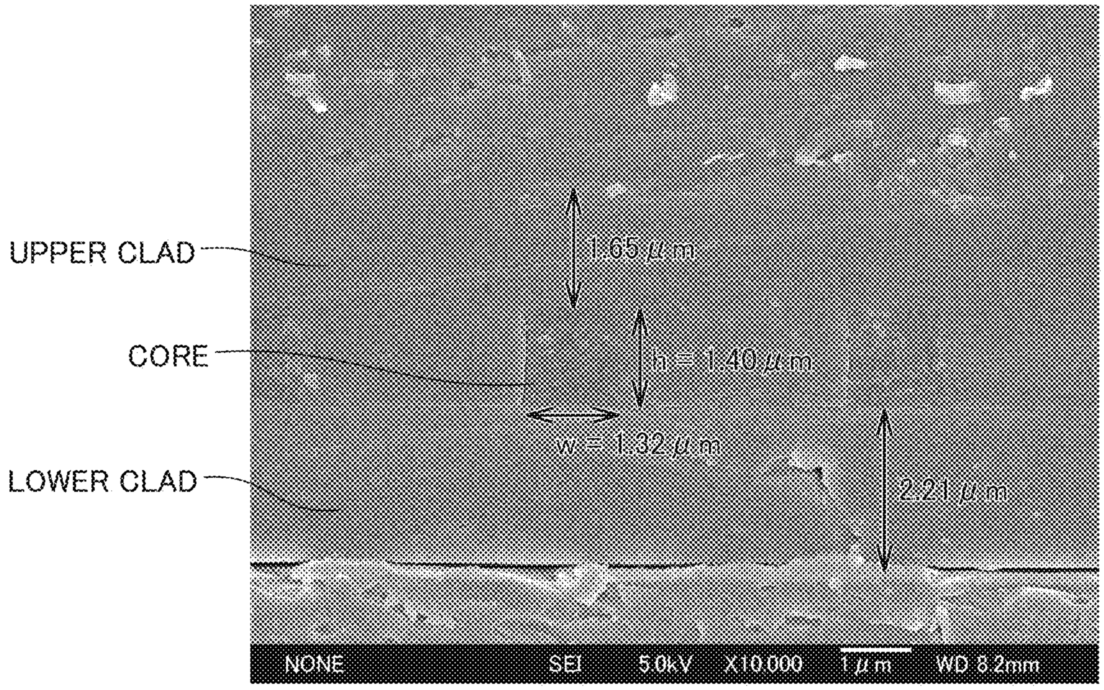
FIG. 9 is an image showing a cross section of a light input end face of an optical modulator obtained in an Example.
Figure 10:
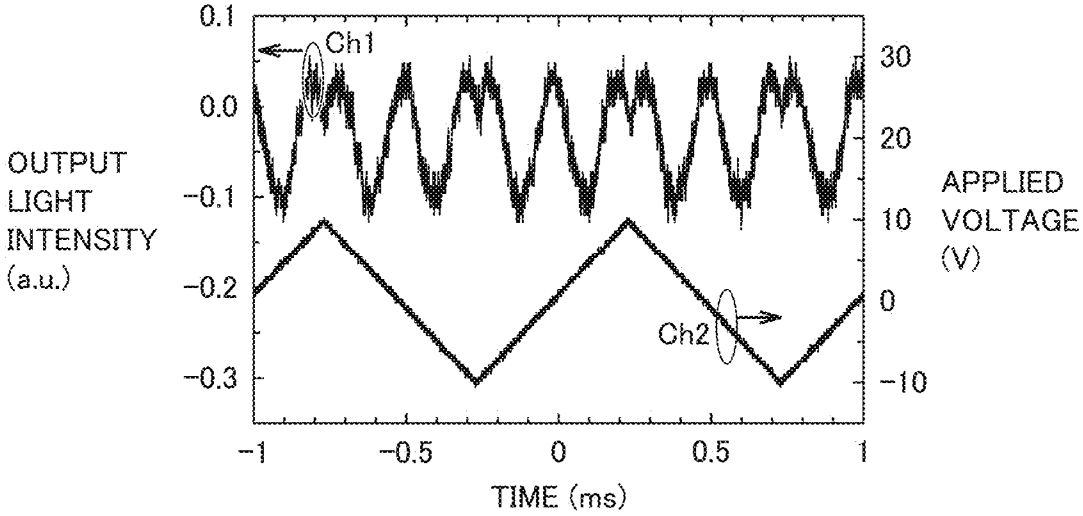
FIG. 10 is a graph showing time waveforms of optical modulation of the optical modulator obtained in the Example.

Both end faces of the optical waveguide were cut with a dicing saw to produce light input and output end faces, whereby an optical modulator having a structure corresponding to FIG. 1 was completed. FIG. 9 is an image showing a cross section of the light input end face of the produced optical modulator. FIG. 10 is a graph showing the time waveforms of optical modulation of the produced optical modulator. As shown in FIG. 10, a channel Ch2 is the applied voltage, and a channel Ch1 is the 1550 nm output light intensity of the MZ optical modulator. With respect to a voltage change with a triangular waveform, a light output waveform of a typical MZ optical modulator is shown, the above-described $V_\pi$ was 4.4 V, and the above-described $V_\pi L$ was 4.4 V·cm.

Example 7

As an optical control element, an optical modulator for use at a wavelength of 640 nm was produced by the following procedure, and the figure of merit of optical modulation was evaluated.

(Preparation of EO Polymer (E-5a))

An EO polymer (E-5a) expressed by the following formula was prepared by the following procedure. As the figure of merit at a wavelength of 640 nm of the EO polymer (E-5a) calculated based on inhomogeneous broadening analysis (Gaussian dispersion formula), the figure of merit FOM1 was 3.61 $(V\cdot cm)^{-1}$, and the figure of merit FOM2 was 0.60 $(V\cdot dB)^{-1}$.

[Chem. 20]

(E-5a)

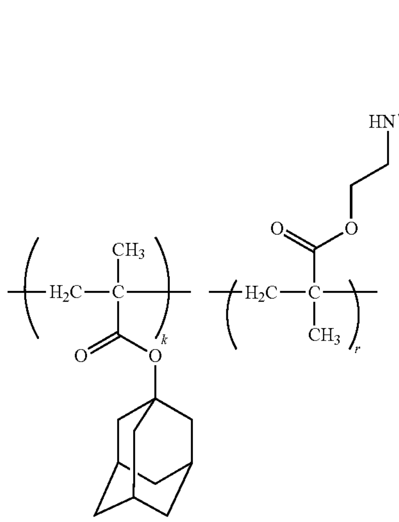

-continued

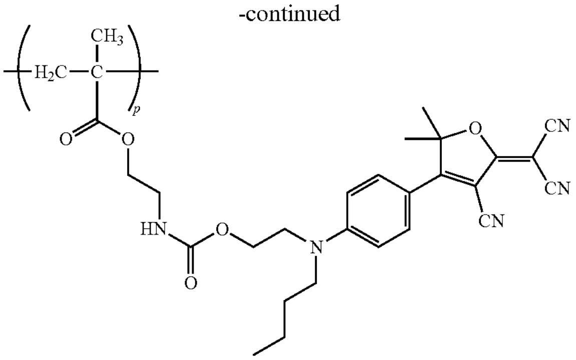

[In the formula, k, p and r represent an integer of 1 or more.]

(Synthesis of Base Polymer (A-5a))

7.00 g (31.8 mmol) of adamantyl methacrylate (AdMA), 2.60 g (16.8 mmol) of 2-(isocyanatoethyl) methacrylate (MOI) and 0.266 g (1.62 mmol) of azobisisobutyronitrile (AIBN) were dissolved in 18 mL of dehydrated toluene, argon was encapsulated, and then the solution was stirred in an oil bath at 70° C. for two hours. The reaction mixture was cooled to room temperature, diluted with 15 mL of dehydrated toluene and then added dropwise to a mixture of 450 mL of dehydrated diisopropyl ether (IPE) and 15 mL of dehydrated toluene, and a precipitate was filtered. The precipitate was sequentially washed with dehydrated IPE and dehydrated hexane, then, dried under reduced pressure at 45° C., thereby obtaining 8.70 g of a base polymer (A-5a).

(Derivatization of Base Polymer (A-5a) (Methyl Carbamate Derivative))

Under Ar gas, 1.0 g of the base polymer (A-5a) was dissolved in 35 mL of dehydrated tetrahydrofuran, 3 mL of dehydrated methanol and 40 µL of dibutyltin dilaurate (DBTDL) were added, and the solution was stirred in an oil bath at 55° C. for two hours. The reaction mixture was cooled, then, poured into 350 mL of diisopropyl ether (IPE) and stirred. A precipitated powder was filtered, washed with 100 mL of IPE and 100 mL of hexane and dried under reduced pressure at 65° C., thereby obtaining a derivative of the base polymer (A-5a).

As a result of analyzing a derivative of the base polymer (A-5a) in the same manner as in the analysis of the derivative of the base polymer (A-1), the glass transition temperature Tg was 155° C., the weight-average molecular weight Mw was 78600, and the number-average molecular weight Mn was 31300.

(Manufacturing of EO Polymer (EO-5a))

6.842 g (11.2 mmol) of the base polymer (A-5a) obtained above was dissolved in 300 mL of dehydrated tetrahydrofuran (THF). 3.430 g (8.48 mmol) of the compound (E-5) and 100 µL of dibutyltin dilaurate (DBTDL) were added to this, and the solution was stirred in an oil bath at 55° C. for two hours. Next, 40 mL of dehydrated methanol was added and stirred at 55° C. for one hour. The reaction mixture was cooled, then, poured into 3.6 L of diisopropyl ether (IPE) and stirred. A precipitated powder was filtered, washed with IPE (100 mL) twice and methanol (100 mL) twice and dried under reduced pressure at 70° C. 9.10 g of the EO polymer (EO-5a) was obtained as a reddish orange powder (glass transition temperature Tg: 164° C.).

(Production of Lower Clad)

A clad material composition prepared by the procedure described in Example 6 was applied onto a lower electrode produced by the procedure described in Example 6 by spin coating (3,000 rpm for 30 seconds), heated at 95° C. for 30 minutes and at 120° C. for 15 minutes, heated at 190° C. for 16 hours, and then irradiated with LED light of 365 nm at 100° C. The film thickness of a produced lower clad was 1.27 μm.

(Production of Core Layer)

A 12 mass % cyclohexanone solution of the EO polymer (E-5a) was applied to the lower clad produced above by spin coating (3,200 rpm for 30 seconds) and heated in a vacuum at 170° C. for one hour. The film thickness of a produced core layer was 0.52 μm.

(Production of Electrode for Polling and Polling Treatment)

An IZO film (100 nm) was formed on the core layer produced above by the sputtering method, an electrode for polling was produced, and a structure for a polling treatment was obtained. The temperature of this structure was raised to 164° C., then, a voltage of 240 V was applied between the lower electrode and the electrode for polling for one minute, and a polling treatment was performed. The structure was cooled to room temperature under the application of the voltage, and then the voltage was turned off. After that, the electrode for polling was removed with an etching solution (ITO-06N manufactured by Kanto Chemical Co., Inc.).

(Formation of Optical Waveguide)

An IZO film (50 nm) was formed on the core layer of the structure on which the polling treatment had been performed as a mask for processing by the sputtering method. After that, a mask pattern was produced by photolithography, the core layer was processed into a ridge structure (a convex portion had a width of 0.99 μm and a height of 0.27 μm) by a dry etching method in which a reactive ion etching apparatus was used, and this was used as an optical waveguide (core). The optical waveguide formed a Mach-Zehnder (MZ) type optical modulator structure.

(Production of Upper Clad)

The clad material composition prepared by the procedure described in Example 6 was applied onto the optical waveguide formed above by spin coating (2,000 rpm for 30 seconds), heated at 90° C. for 10 minutes, and then irradiated with LED light having a wavelength of 365 nm at 100° C. for five minutes. The film thickness of the produced upper clad was 1.55 μm from the upper surface of the optical waveguide (core).

An IZO film (100 nm) was formed on the upper clad layer produced above by the sputtering method. After that, a mask pattern was produced by photolithography, and the IZO film was patterned with an etching solution (ITO-06N manufactured by Kanto Chemical Co., Inc.), thereby forming an upper electrode. The length L of the upper electrode was set to 0.5 cm.

(Production of Optical Modulator)

Figure 11:
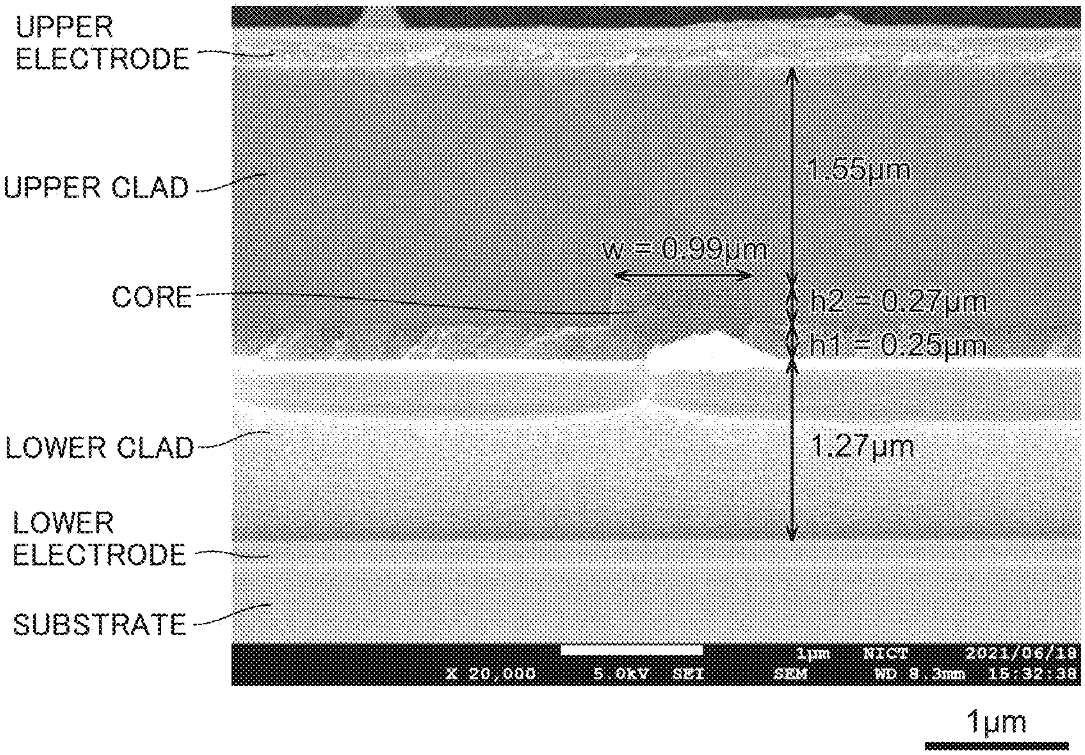
FIG. 11 is an image showing a cross section of a light input end face of an optical modulator obtained in the Example.
Figure 12:
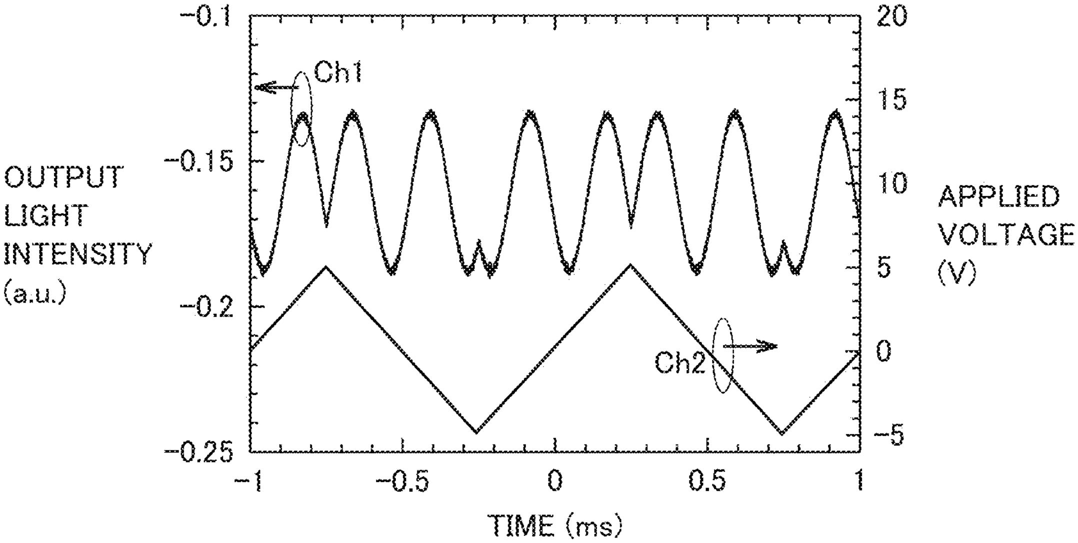
FIG. 12 is a graph showing time waveforms of optical modulation of the optical modulator obtained in the Example.

Both end faces of the waveguide were cut with a dicing saw to produce light input and output end faces, whereby an optical modulator having a structure corresponding to FIG. 1 was completed. FIG. 11 is a cross-sectional image of the light input end face of the produced optical modulator. FIG. 12 is a graph showing the time waveforms of optical modulation of the produced optical modulator. In FIG. 12, a channel Ch1 is the 640 nm output light intensity of the MZ optical modulator, and a channel Ch2 is the applied voltage. With respect to a voltage change with a triangular waveform, a light output waveform of a typical MZ optical modulator is shown, the above-described $V_\pi$ was 2.48 V, and the above-described $V_\pi L$ was 1.24 V·cm.

Since the value of $V_\pi L$ calculated in Example 7 was smaller than the value of $V_\pi L$ calculated in Example 6, it is found that the optical modulator produced in Example 7 has excellent high-speed performance in a wavelength band near 640 nm and is useful (highly efficient) in the wavelength band.

INDUSTRIAL APPLICABILITY

The present invention is capable of determining a wavelength band suitable for the use of optical control elements such as an optical modulator, an optical switch, an optical transceiver, an optical phased array, a LiDAR, smart glasses, an optical interconnect, an optoelectronic circuit, a wavelength converter, an electric field sensor and a THz wave generator/detector. In particular, it is possible to realize an optical control element that is highly efficient in shorter wavelength bands than the C band using an electro-optic material such as an electro-optic polymer that has not been attracting attention conventionally.

REFERENCE SIGNS LIST

10*a*, 10*b* arm portion, 11 core, 12 clad, 15 upper electrode, 16 lower electrode.

The invention claimed is:

1. A manufacturing method of an optical control element in the wavelength band, the method comprising:

a determination method for selecting materials for an optical control element comprising determining an operation wavelength band for the optical control element, wherein the optical control element has an optical waveguide formed using an electro-optic material, wherein the operation wavelength band corresponds to wavelengths at which the optical control element is used, selecting a formula (I), a formula (II) or both for calculating a figure of merit of the electro-optic material at a wavelength λ based on a required characteristic of the optical control element, wherein the required characteristic of the optical control element includes at least one of a high-speed performance and a power saving, the formula (1) is associated with the high-speed performance and the formula (II) is associated with the power saving, calculating a figure of merit FOM1, a figure of merit FOM2 or both using the selecting the selected formula (1), the selected formula (11) or both, wherein the figure of merit FOM1, the figure of merit FOM2, the formula (1) and the formula (11) are represented as:

$$FOM1 = \frac{n^3 r}{\lambda^2} \quad \text{(I)}$$

$$FOM2 = \frac{n^3 r}{\alpha\lambda^2} \quad \text{(II)}$$

wherein n is a refractive index of the electro-optic material, r is an electro-optic coefficient of the electro-optic material, α is a propagation loss per unit length in a phase modulation region in the optical waveguide, and λ is a wavelength equal to, or shorter than 1529 nm, in the determining, (i) whether the figure of merit FOM1 at the wavelength λ reaches 1.2 (V-cm)-1 or more, (ii) whether the figure of merit FOM2 at the wavelength λ reaches 0.2 (V-dB)-1 or more, or (iii)

whether (i) and (ii) are satisfied, and when (i) is satisfied, the wavelength λ is determined for obtaining the high-speed performance during use of the optical control element, when (ii) is satisfied, the wavelength A is determined for obtaining the saving of power during use of the optical control element; when (i) and (ii) are satisfied, the wavelength λ is determined for obtaining both high-speed performance and saving of power during use of the optical control element, and selecting the electro-optic material based on the figure of merit FOM1, the figure of merit FOM2 or both; and forming the optical waveguide using the electro-optic material.

2. The manufacturing method according to claim 1, wherein, in the selecting, at least the formula (II) is selected, and in the calculating, when a ratio ($Loss_{max}/L_{max}$) between a maximum propagation loss $Loss_{max}$ of the phase modulation region and a maximum length $L_{max}$ of the phase modulation region is defined as a maximum propagation loss per unit length $\alpha_c$ in the phase modulation region for the optical control element, at each wavelength λ, in a case where there is a relationship of $\alpha \leq \alpha_c$, the figure of merit FOM2 is calculated with a substitution of $\alpha = \alpha_c$, and, in a case where there is a relationship of $\alpha > \alpha_c$, the figure of merit FOM2 is calculated using α, wherein $\alpha_c$ is 0 or 6.

3. The manufacturing method according to claim 1, wherein the electro-optic material is an electro-optic polymer.

4. The manufacturing method according to claim 1, wherein the optical waveguide is composed of a core and a clad provided on a circumference of the core.

5. The determination manufacturing method according to claim 1, wherein the optical control element is an optical modulator.

6. The determination manufacturing method according to claim 1, wherein λ is equal to, or shorter than 1259 nm.

7. An optical control element comprising:

an optical waveguide formed of an electro-optic material, wherein the following [A] and/or [B] is satisfied,

[A] the electro-optic material has a figure of merit FOM1 calculated based on the following formula (I) of 1.2 $(V \cdot cm)^{-1}$ or more at any wavelength in a wavelength band of 1259 nm or shorter, and the optical control element is used in a wavelength band of 1259 nm or shorter where the figure of merit FOM1 becomes 1.2 $(V \cdot cm)^{-1}$ or more,

[B] the electro-optic material has a figure of merit FOM2 calculated based on the following formula (II) of 0.20 $(V \cdot dB)^{-1}$ or more at any wavelength in a wavelength band of 1259 nm or shorter, and the optical control element is used in a wavelength band of 1259 nm or shorter where the figure of merit FOM2 becomes 0.20 $(V \cdot dB)^{-1}$ or more, $$FOM1 = \frac{n^3 r}{\lambda^2} \quad (I)$$

$$FOM2 = \frac{n^3 r}{\alpha \lambda^2} \quad (II)$$

wherein n is a refractive index of the electro-optic material, r is an electro-optic coefficient of the electro-optic material, α is a propagation loss per unit length in a phase modulation region in the optical waveguide, and λ is a wavelength which is equal to or shorter than 1259 nm, wherein the optical waveguide is composed of a core and a clad provided on a circumference of the core.

8. The optical control element according to claim 7, wherein the electro-optic material is an electro-optic polymer.

9. The optical control element according to claim 7, wherein the optical control element is an optical modulator.

* * * * *